US008154636B2

(12) United States Patent  (10) Patent No.: US 8,154,636 B2
Rappaport et al.  (45) Date of Patent: Apr. 10, 2012

(54) IMAGE ENHANCEMENT USING HARDWARE-BASED DECONVOLUTION

(75) Inventors: Elchanan Rappaport, Dolev (IL); Yoav Lavi, Raanana (IL); David Drori, Jerusalem (IL); Uri Kinrot, Hod Hasharon (IL)

(73) Assignee: DigitalOptics Corporation International, San Jose, CA (US)

( * ) Notice: Subject to any disclaimer, the term of this patent is extended or adjusted under 35 U.S.C. 154(b) by 653 days.

(21) Appl. No.: 12/096,943

(22) PCT Filed: Dec. 17, 2006

(86) PCT No.: PCT/IL2006/001450
§ 371 (c)(1),
(2), (4) Date: Oct. 8, 2008

(87) PCT Pub. No.: WO2004/063989
PCT Pub. Date: Jul. 29, 2004

(65) Prior Publication Data
US 2009/0128666 A1  May 21, 2009

Related U.S. Application Data

(60) Provisional application No. 60/753,162, filed on Dec. 21, 2005.

(51) Int. Cl.
*H04N 3/14* (2006.01)
*H04N 5/335* (2011.01)
(52) U.S. Cl. .......... 348/294; 348/222.1; 348/298; 348/302; 348/308; 348/312

(58) Field of Classification Search .......... 348/294, 348/302, 308, 312, 606, 624; 250/208.1; 257/290–292; 382/254, 260–263, 266
See application file for complete search history.

(56) References Cited

U.S. PATENT DOCUMENTS
3,971,065 A  7/1976  Bayer
(Continued)

FOREIGN PATENT DOCUMENTS
WO  WO-2004063989  7/2004

OTHER PUBLICATIONS

William K. Pratt: "Superposition and Convolution" in Digital Image Processing, 1991, 2nd edition, pp. 171-176.

(Continued)

*Primary Examiner* — Yogesh Aggarwal
(74) *Attorney, Agent, or Firm* — Hickman Palermo Truong & Becker LLP

(57) ABSTRACT

An image enhancement circuit (26, 60, 190, 260) includes an input interface (64, 262), which is operative to accept a stream of input pixel values belonging to pixels (32) of an input image. The input image includes a plurality of different input sub-images including respective subsets of the pixels, such that the input pixel values of the pixels in the different input sub-images are interleaved in the stream. A plurality of filter cells (92, 144, 206, 222, 238, 364) are connected in a two-dimensional array configuration and are arranged to separately filter the input pixel values of each of the input sub-images with respective two-dimensional deconvolution kernels so as produce respective output sub-images that include output pixel values. A multiplexer (88, 332) is coupled to multiplex together the output pixel values of the output sub-images so as to produce a filtered output image.

30 Claims, 20 Drawing Sheets

U.S. PATENT DOCUMENTS

| | | | |
|---|---|---|---|
| 4,697,208 | A | 9/1987 | Eino et al. |
| 6,154,574 | A | 11/2000 | Paik et al. |
| 6,366,318 | B1 | 4/2002 | Smith et al. |
| 6,757,012 | B1 | 6/2004 | Hubina |
| 6,900,838 | B1 | 5/2005 | Fujimura |
| 7,135,698 | B2 * | 11/2006 | Mitra ............... 257/21 |
| 2003/0122055 | A1 * | 7/2003 | Rughani ............ 250/208.1 |
| 2005/0025380 | A1 | 2/2005 | Keshet |
| 2005/0121596 | A1 * | 6/2005 | Kam et al. ........... 250/201.2 |
| 2006/0013479 | A1 | 1/2006 | Trimeche et al. |
| 2006/0279639 | A1 | 12/2006 | Silverstein et al. |
| 2007/0236573 | A1 | 10/2007 | Alon et al. |
| 2007/0236574 | A1 | 10/2007 | Alon et al. |
| 2007/0239417 | A1 | 10/2007 | Alon et al. |
| 2008/0095466 | A1 | 4/2008 | Kinrot et al. |
| 2009/0122180 | A1 | 5/2009 | Shabtay et al. |
| 2009/0147111 | A1 | 6/2009 | Litvinov et al. |

OTHER PUBLICATIONS

European Patent Office, "Supplementary European Search Report", Application No. EP 06809844, dated Sep. 10, 2009, 11 pages.
Claims, Application No. EP 06809844, 4 pages.
The State Intellectuall Property of the People's Republic of China, Office Action from China for foreign patent application No. 200680050359.3 (English translation), Applicant: Tessera International, Inc., dated Jan. 26, 2011.
Current claims for China Office Action for foreign patent application No. 200680050359.3., 6 pages.

* cited by examiner

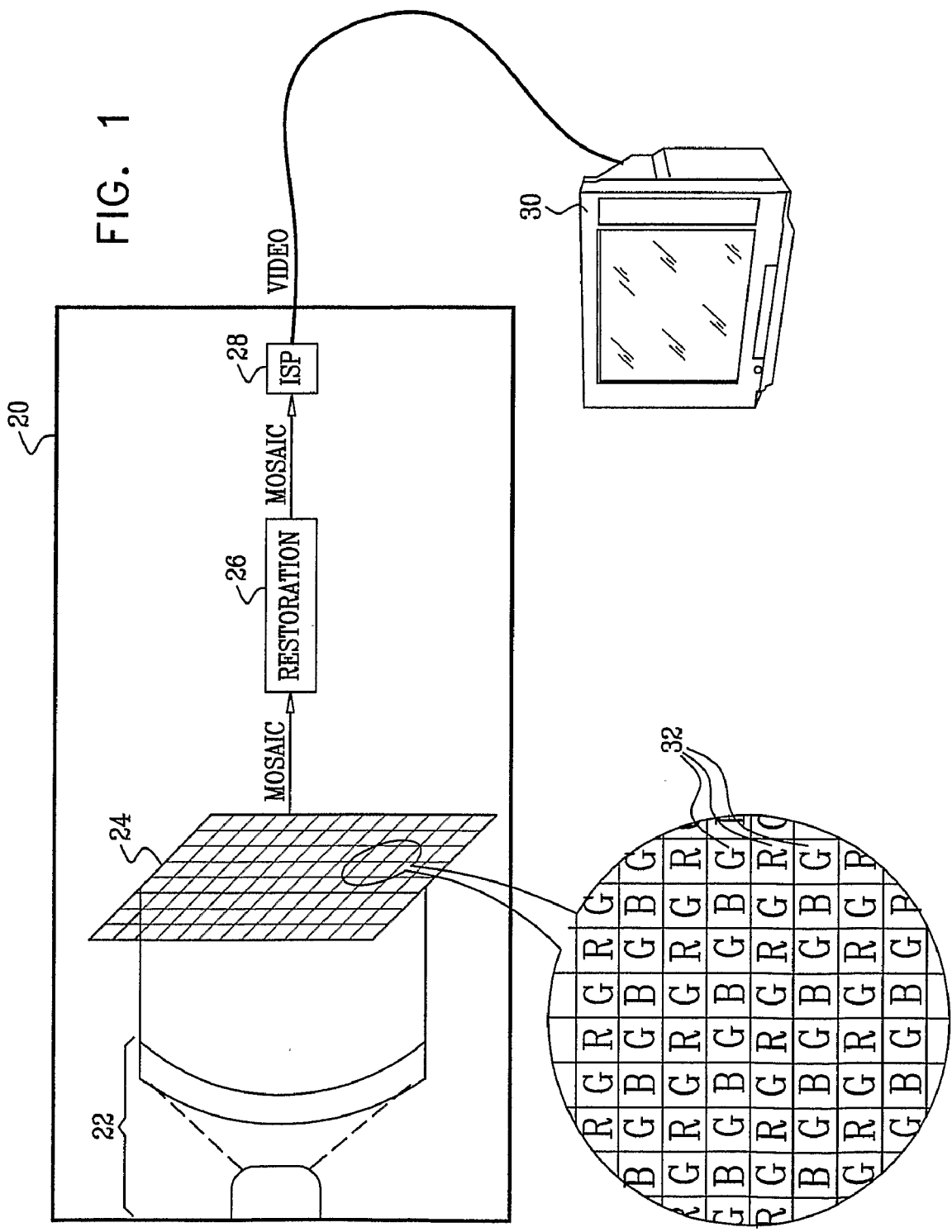

FIG. 2

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | B/R | G | B/R | G | B/R | G | B/R | G | B/R | G | B/R | G | B/R | G | B/R | G |
| 2 | G | R/B | G | R/B | G | R/B | G | R/B | G | R/B | G | R/B | G | R/B | G | R/B |
| 3 | B/R | G | B/R | G | B/R | G | B/R | G | B/R | G | B/R | G | B/R | G | B/R | G |
| 4 | G | R/B | G | R/B | G | R/B | G | R/B | G | R/B | G | R/B | G | R/B | G | R/B |
| 5 | B/R | G | B/R | G | B/R | G | B/R | G | B/R | G | B/R | G | B/R | G | B/R | G |
| 6 | G | R/B | G | R/B | G | R/B | G | R/B | G | R/B | G | R/B | G | R/B | G | R/B |
| 7 | B/R | G | B/R | G | B/R | G | B/R | G | B/R | G | B/R | G | B/R | G | B/R | G |
| 8 | G | R/B | G | R/B | G | R/B | G | R/B | G | R/B | G | R/B | G | R/B | G | R/B |
| 9 | B/R | G | B/R | G | B/R | G | B/R | G | B/R | G | B/R | G | B/R | G | B/R | G |
| 10 | G | R/B | G | R/B | G | R/B | G | R/B | G | R/B | G | R/B | G | R/B | G | R/B |
| 11 | B/R | G | B/R | G | B/R | G | B/R | G | B/R | G | B/R | G | B/R | G | B/R | G |
| 12 | G | R/B | G | R/B | G | R/B | G | R/B | G | R/B | G | R/B | G | R/B | G | R/B |
| 13 | B/R | G | B/R | G | B/R | G | B/R | G | B/R | G | B/R | G | B/R | G | B/R | G |
| 14 | G | R/B | G | R/B | G | R/B | G | R/B | G | R/B | G | R/B | G | R/B | G | R/B |
| 15 | B/R | G | B/R | G | B/R | G | B/R | G | B/R | G | B/R | G | B/R | G | B/R | G |

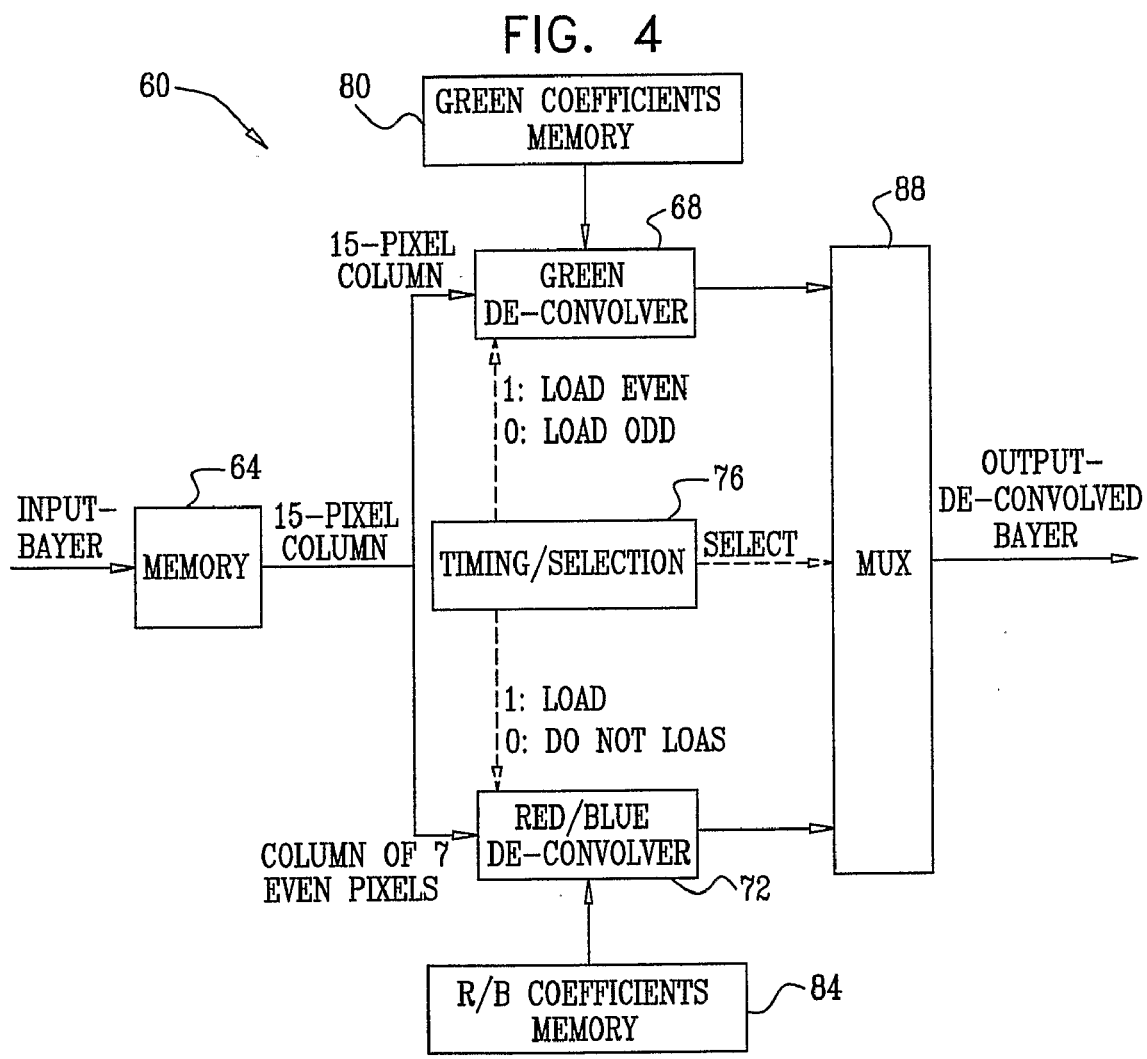

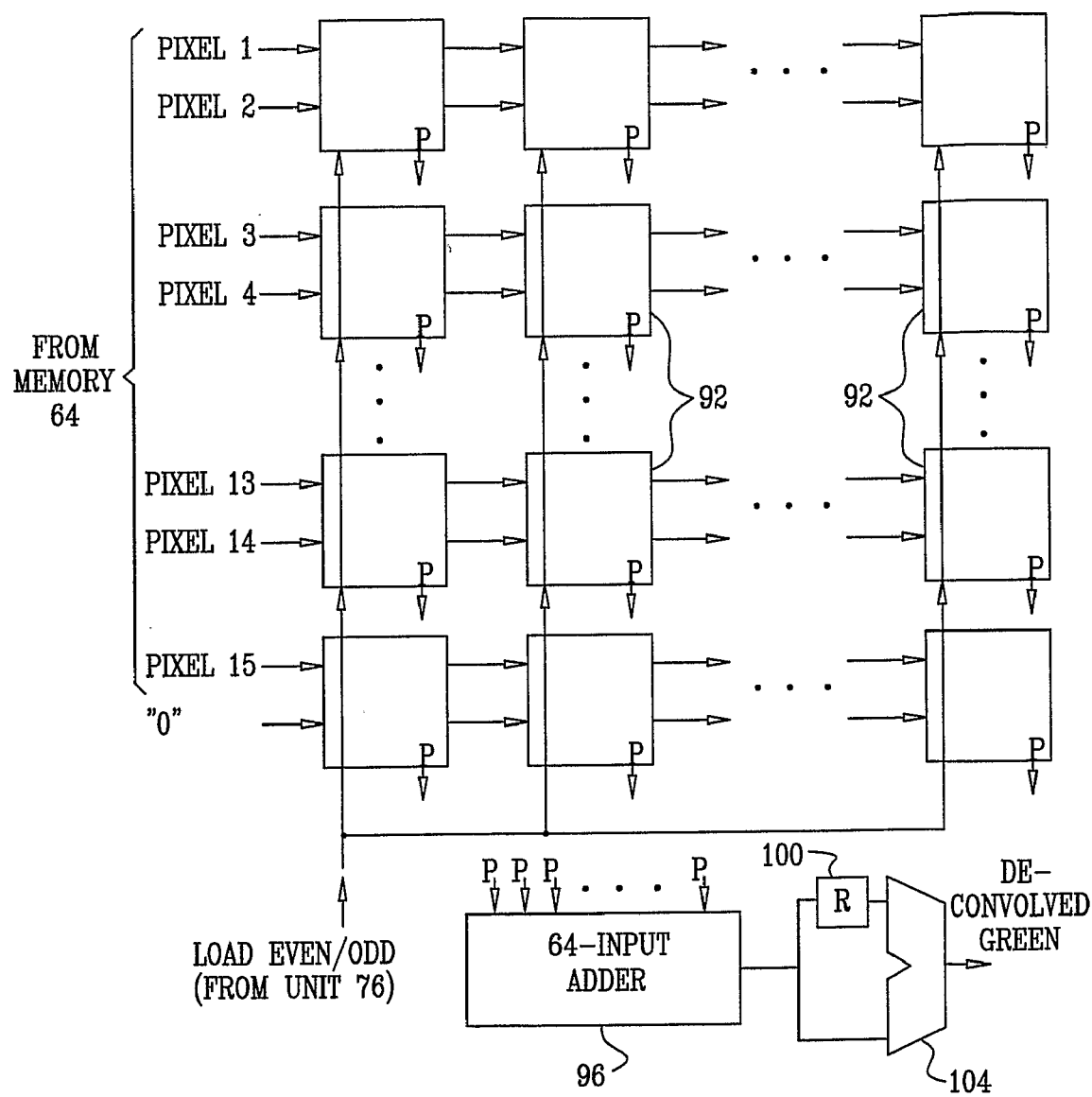

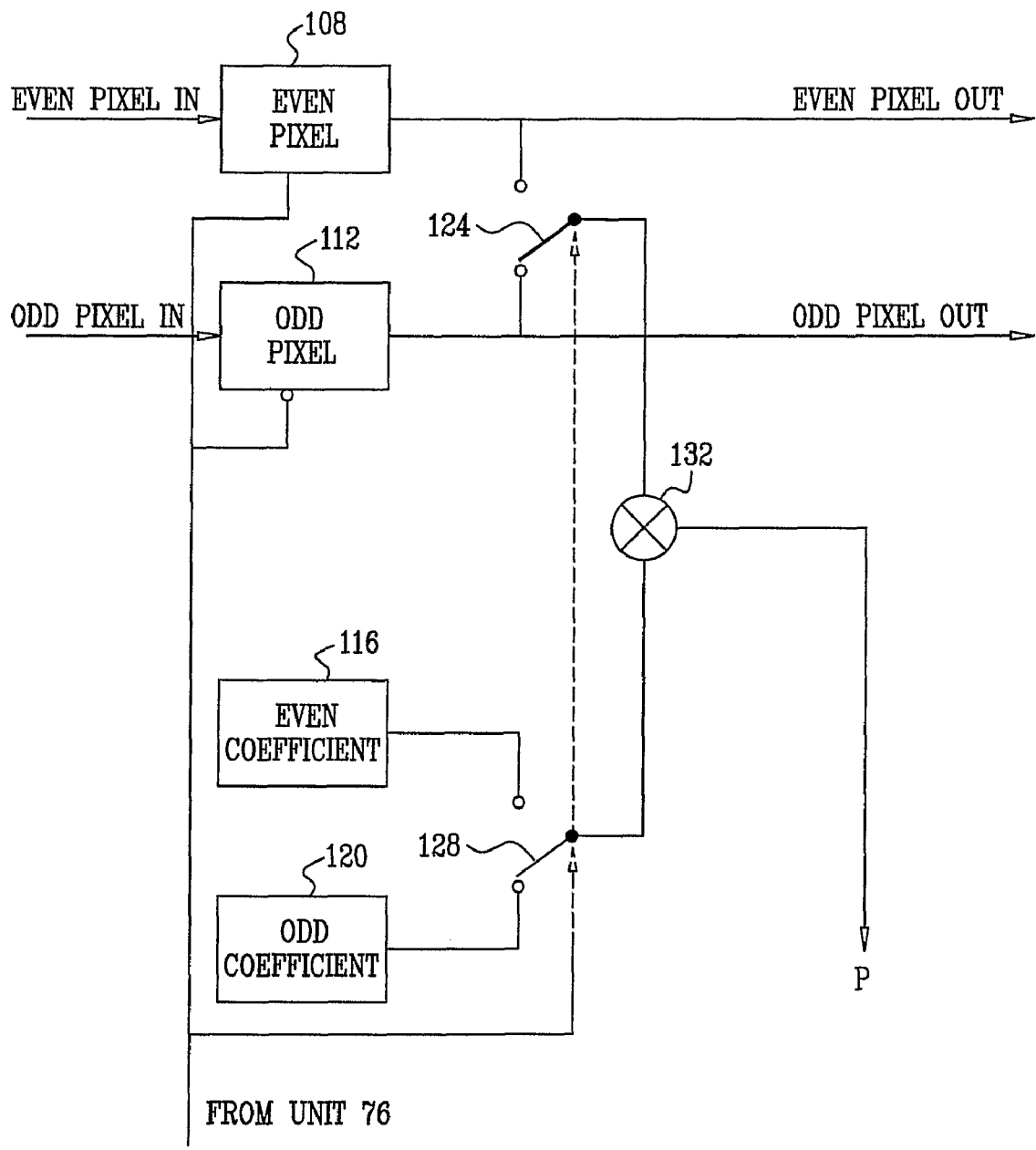

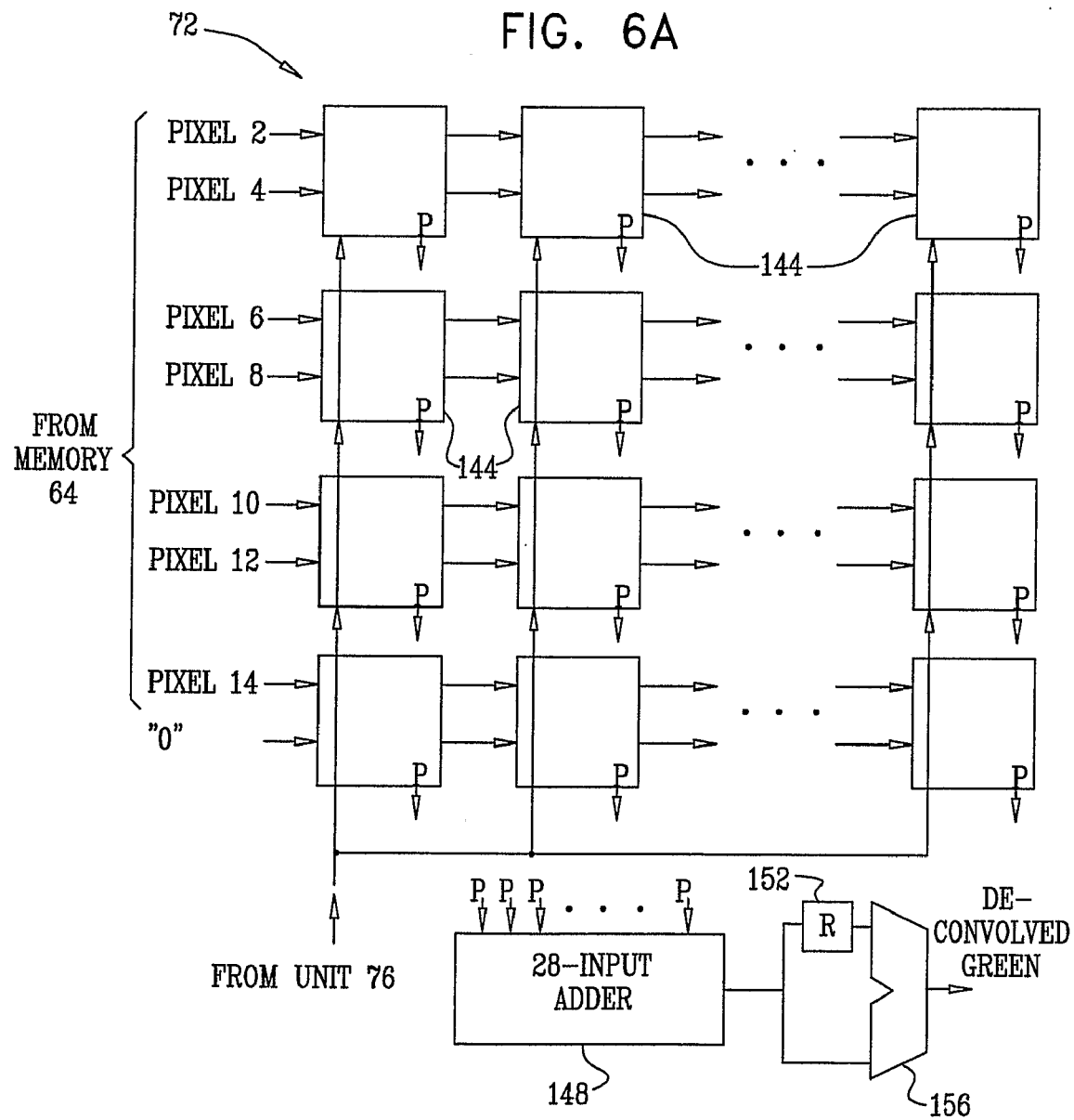

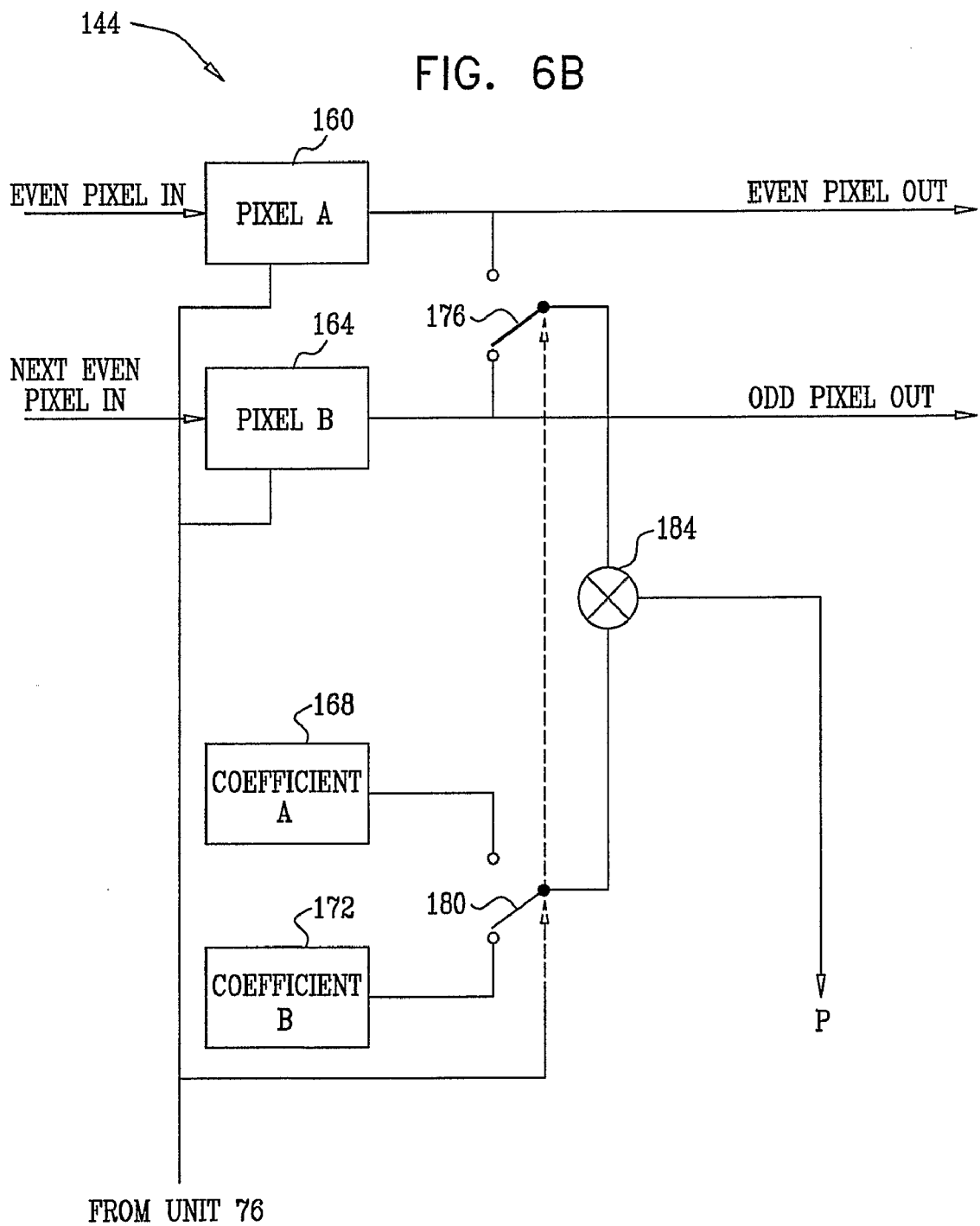

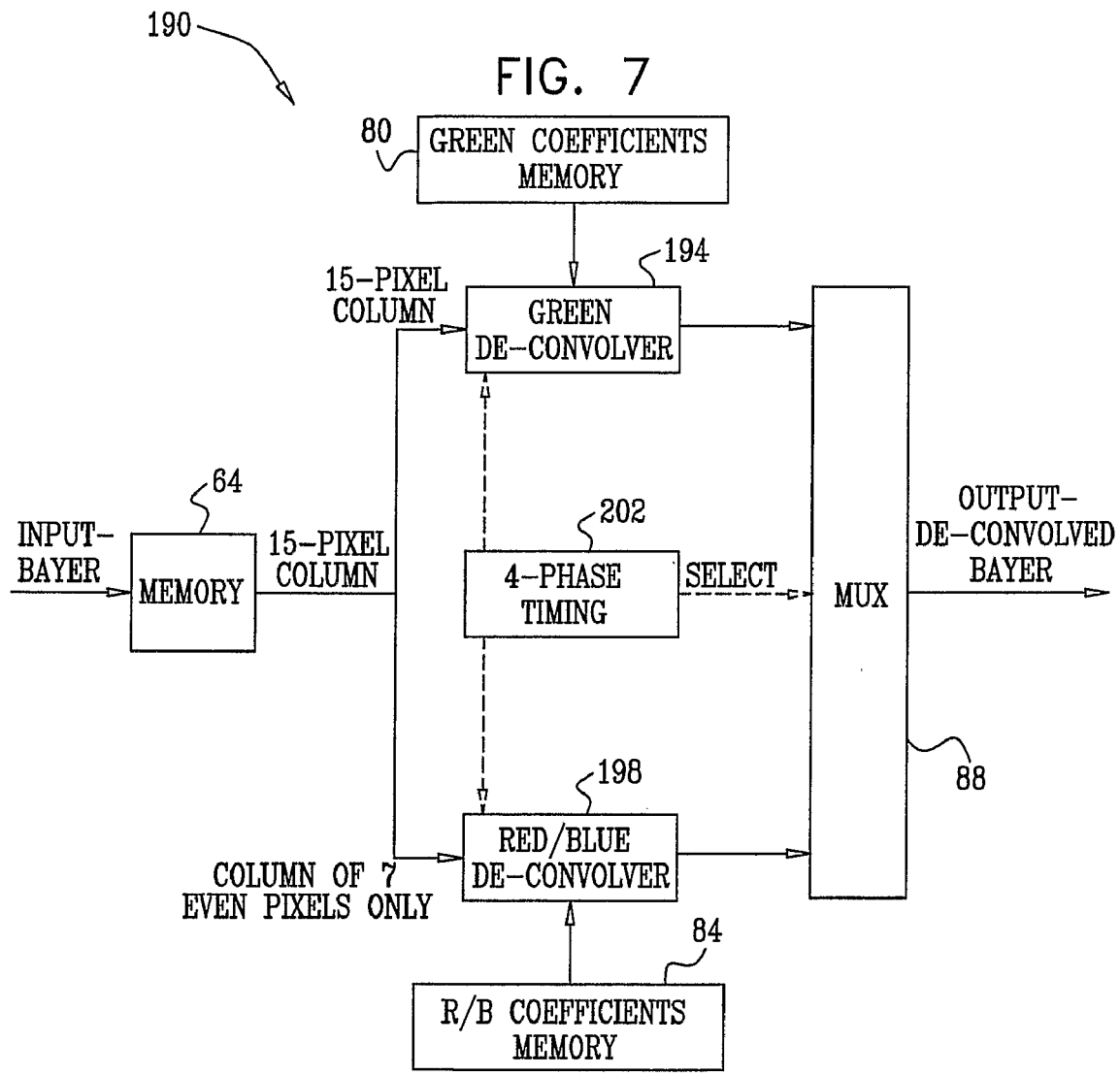

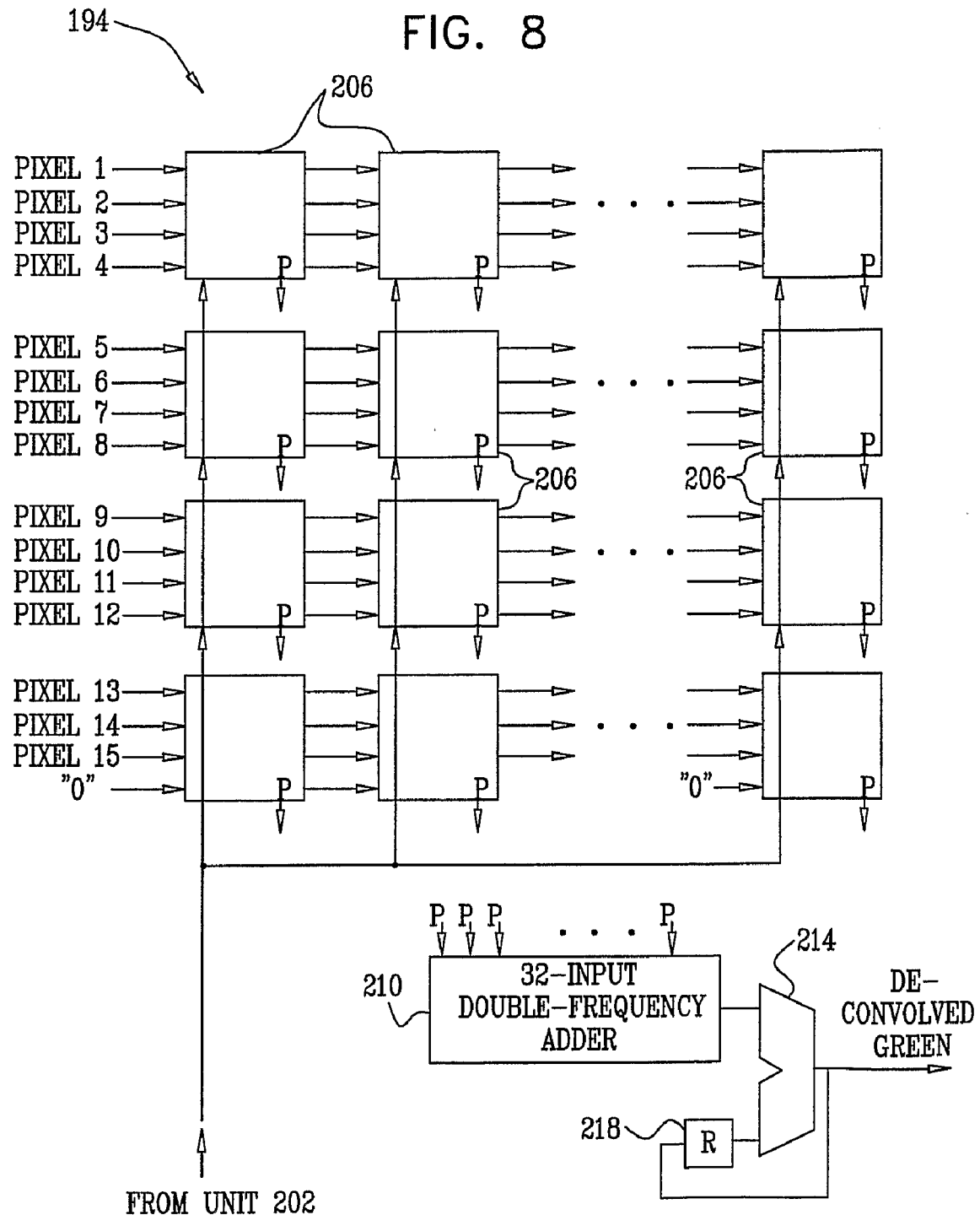

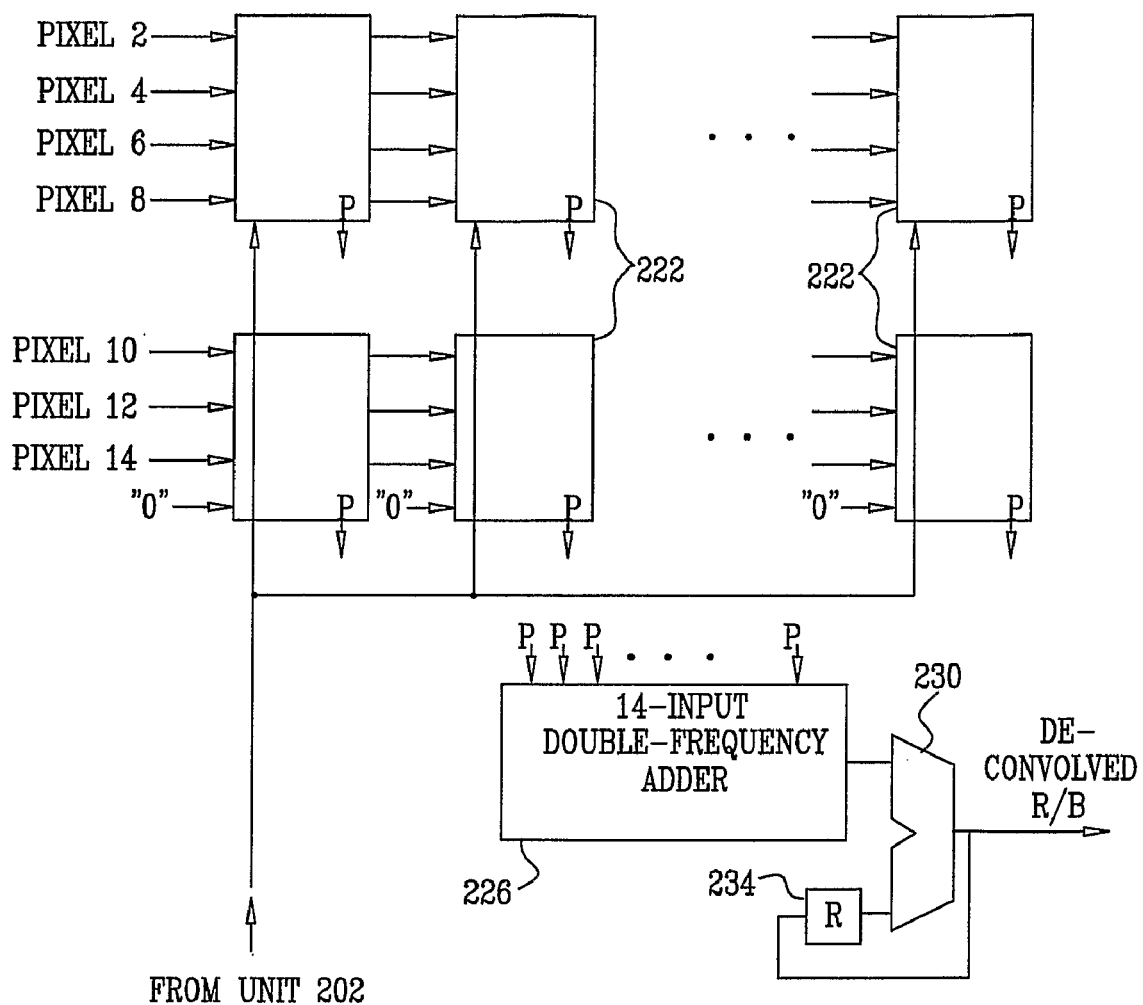

IMAGE ENHANCEMENT USING HARDWARE-BASED DECONVOLUTION

CROSS REFERENCE TO PRIOR APPLICATIONS

This application is the U.S. national phase of International Application No. PCT/IL2006/001450, filed Dec. 17, 2006, which claims the benefit of U.S. Provisional Patent Application 60/753,162, filed Dec. 21, 2005. The disclosure of both applications is incorporated herein by reference in their entirety. The International Application published in English on Jun. 28, 2007 as WO 2007/072477 under PCT Article 21(2).

FIELD OF THE INVENTION

The present invention relates generally to digital imaging, and particularly to methods and systems for enhancing image quality in digital cameras.

BACKGROUND OF THE INVENTION

In many digital imaging applications, the image obtained by the imaging optics is blurred, out of focus or otherwise distorted. For example, the imaging optics of some low-cost and small-size cameras often have non-negligible optical point spread functions (PSFs). Several methods are known in the art for compensating for non-ideal PSFs and other optical distortion effects using digital image processing.

For example, U.S. Pat. No. 6,154,574, whose disclosure is incorporated herein by reference, describes a method for digitally focusing an out-of-focus image in an image processing system. A mean step response is obtained by dividing a defocused image into sub-images, and calculating step responses with respect to the edge direction in each sub-image. The mean step response is used in calculating PSF coefficients, which are applied in turn to determine an image restoration transfer function. An in-focus image is obtained by multiplying this function by the out-of-focus image in the frequency domain.

PCT International Publication WO 2004/063989 A2, whose disclosure is incorporated herein by reference, describes an electronic imaging camera, comprising an image sensing array and an image processor, which applies a deblurring function—typically in the form of a deconvolution filter (DCF)—to the signal output by the array in order to generate an output image with reduced blur. This blur reduction makes it possible to design and use camera optics with a poor inherent PSF, while restoring the electronic image generated by the sensing array to give an acceptable output image.

Low-cost color cameras typically use a single solid-state image sensor with a multi-colored mosaic filter overlay. A mosaic filter is a mask of miniature color filter elements in which a filter element is positioned in front of each detector element of the image sensor. For example, U.S. Pat. No. 4,697,208, whose disclosure is incorporated herein by reference, describes a color image pickup device that has a solid-state image sensing element and a complementary color type mosaic filter. Any sort of image sensor with a color mosaic filter, regardless of the choice and arrangement of the colors in the mosaic, is referred to hereinbelow as a "mosaic image sensor."

The filter elements in the mosaic filter generally alternate between the primary RGB colors, or between the complementary colors cyan, magenta and yellow. One common type of color mosaic filter is called a "Bayer sensor" or "Bayer mosaic," which has the following general form (in which letters represent colors—R denotes red, G denotes green and B denotes blue):

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

The different color filters have respective passbands, which may overlap. The Bayer mosaic is described in U.S. Pat. No. 3,971,065, whose disclosure is incorporated herein by reference.

Processing the image produced by a mosaic image sensor typically involves reconstructing the full color image by extracting three color signals (red, green and blue) from the sensor output. An image signal processor (ISP) processes the image sensor output in order to compute luminance (Y) and chrominance (C) values for each pixel of the output image. The ISP then outputs these values (or the corresponding R, G and B color values) in a standard image format.

SUMMARY OF THE INVENTION

There is therefore provided, in accordance with an embodiment of the present invention, an image enhancement circuit, including:

an input interface, which is operative to accept a stream of input pixel values belonging to pixels of an input image, which includes a plurality of different input sub-images including respective subsets of the pixels, such that the input pixel values of the pixels in the different input sub-images are interleaved in the stream;

a plurality of filter cells, which are connected in a two-dimensional array configuration and are arranged to separately filter the input pixel values of each of the input sub-images with respective two-dimensional deconvolution kernels so as produce respective output sub-images including output pixel values; and a multiplexer, which is coupled to multiplex together the output pixel values of the output sub-images so as to produce a filtered output image.

In some embodiments, the input image has an input blur, and the output image has an output blur, after filtering with the deconvolution kernels, that is smaller than the input blur.

In another embodiment, the array configuration has rows and columns of the filter cells, the input interface includes a memory, which is arranged to buffer the input pixel values and to provide successive columns of the buffered input pixel values to the filter cells, and each column of the filter cells is arranged to propagate the columns of the input pixel values to a next column of the filter cells in the array configuration, so as to deconvolve the input pixel values with the deconvolution kernels.

In yet another embodiment, the deconvolution kernels include filter coefficients, and each of the filter cells includes a multiplier, which is arranged to multiply one of the input pixel values by one of the filter coefficients to produce an output of the filter cell. The multiplier may be arranged to perform two multiplications in each cycle of a pixel clock at which the input pixels are accepted. In still another embodiment, the circuit includes an accumulator circuit, which is arranged to accumulate the outputs of the filter cells to produce the output pixel values. The accumulator is sometimes arranged to accumulate the outputs over two successive cycles of a pixel clock at which the input pixels are accepted.

In an embodiment, the array configuration has rows and columns of the filter cells, the input interface is arranged to provide successive columns of the input pixel values to the filter cells such that each input pixel value is simultaneously provided to all the filter cells in a corresponding row of the filter cells, each filter cell includes a multiplier, which is arranged to multiply the input pixel value provided thereto by a filter coefficient of one of the deconvolution kernels to produce a multiplication result, and the circuit includes an accumulation circuit, which is arranged to calculate column sums of the multiplication results in each of the columns of the filter cells, to apply delays to the column sums and to combine the delayed column sums to produce the output pixel values.

In another embodiment, the stream of input pixel values is provided by a mosaic image sensor such that the pixel values in each of the input sub-images are produced by the image sensor responsively to light of a different, respective color, and the filter cells are arranged to filter the input sub-images to produce the output sub-images corresponding to the respective colors. In yet another embodiment, the input sub-images include green, red and blue sub-images, and the filter cells are configured in a first two-dimensional array, which is arranged to filter the input values belonging to the green sub-image, and a second two-dimensional array, which is arranged to alternately filter the input values belonging to the red and blue sub-images.

In still another embodiment, the deconvolution kernels include filter coefficients, the filter cells include respective multipliers, which are arranged to multiply the input pixel values by the filter coefficients in accordance with a predetermined assignment, and the circuit includes selection and accumulation logic, which is configured to separately accumulate outputs of the multipliers that multiply the input pixel values belonging to each of the input sub-images, so as to produce the output pixel values.

In some embodiments, the input image is divided into multiple segments, and the filter cells are arranged to use at least first and second different deconvolution kernels for filtering the values of the input pixels located in respective at least first and second areas of the input image. In some embodiments, the first and second segments have respective different first and second sizes, which are respectively determined responsively to a spatial variability of a blur in the first and second segments.

In another embodiment, the input image is divided into symmetry zones based on a symmetrical property of a blur in the input image, and the filter cells are arranged to filter the values of the input pixels located in one of the symmetry zones using baseline deconvolution kernels and to filter the values of the input pixels located in the other symmetry zones using respective deconvolution kernels determined by applying symmetrical operations to the baseline kernels.

There is additionally provided, in accordance with an embodiment of the present invention, a method for imaging, including:

accepting a stream of input pixel values belonging to pixels of an input image, which includes a plurality of different input sub-images including respective subsets of the pixels, such that the input pixel values of the pixels in the different input sub-images are interleaved in the stream;

separately filtering the input values of each of the input sub-images with respective two-dimensional deconvolution kernels using a plurality of hardware-implemented filter cells connected in a two-dimensional array configuration, so as produce respective output sub-images including output pixel values; and multiplexing the output pixel values of the output sub-images so as to produce a filtered output image.

There is also provided, in accordance with an embodiment of the present invention, an imaging apparatus, including:

a mosaic image sensor, which is configured to generate a stream of input pixel values belonging to a plurality of input sub-images, each sub-image responsive to light of a different, respective color that is incident on the mosaic image sensor, such that the input pixel values of the pixels in the different input sub-images are interleaved in the stream;

an image enhancement circuit, which is coupled to receive and filter the input pixel values in each of the input sub-images using a plurality of filter cells connected in a two-dimensional array configuration, so as to generate a corresponding plurality of enhanced output sub-images; and an image signal processor (ISP), which is coupled to receive and combine the plurality of the output sub-images in order to generate a color output image.

The present invention will be more fully understood from the following detailed description of the embodiments thereof, with reference to the attached drawings in which:

BRIEF DESCRIPTION OF THE DRAWINGS

FIG. 1 is a block diagram that schematically illustrates an electronic imaging camera, in accordance with an embodiment of the present invention;

FIGS. 2, 3A and 3B are schematic illustrations of deconvolution kernels, in accordance with an embodiment of the present invention;

FIG. 4 is a block diagram that schematically illustrates an image restoration circuit, in accordance with an embodiment of the present invention;

FIGS. 5A and 5B are block diagrams that schematically illustrate a green pixel deconvolver used in the circuit of FIG. 4, in accordance with an embodiment of the present invention;

FIGS. 6A and 6B are block diagrams that schematically illustrate a red/blue pixel deconvolver used in the circuit of FIG. 4, in accordance with an embodiment of the present invention;

FIG. 7 is a block diagram that schematically illustrates an image restoration circuit, in accordance with another embodiment of the present invention;

FIG. 8 is a block diagram that schematically illustrates a green pixel deconvolver used in the circuit of FIG. 7, in accordance with an embodiment of the present invention;

FIG. 9 is a block diagram that schematically illustrates a red/blue pixel deconvolver used in the circuit of FIG. 7, in accordance with an embodiment of the present invention;

FIG. 17 is a diagram showing assignment of deconvolution filter symmetries to segments of an image, in accordance with an embodiment of the present invention; and FIG. 18 is a diagram showing an assignment of deconvolution coefficients to segments of an image, in accordance with an embodiment of the present invention.

DETAILED DESCRIPTION OF EMBODIMENTS

Overview

Figure 10:
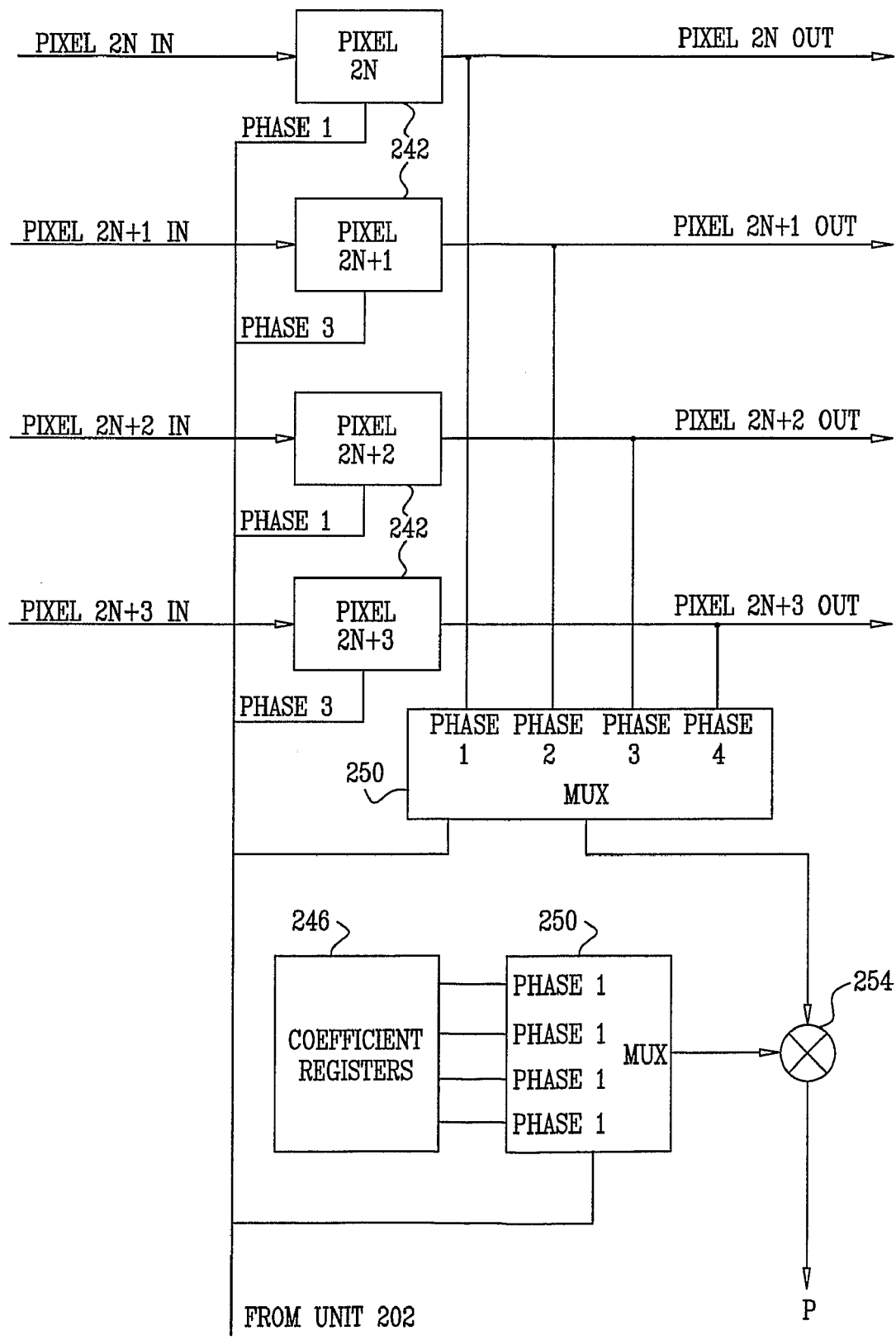
FIG. 10 is a block diagram that schematically illustrates a deconvolution filter cell used in the circuits of FIGS. 8 and 9, in accordance with an embodiment of the present invention.

Embodiments of the present invention provide methods and circuits for enhancing the quality of color images produced by mosaic image sensors. These methods and circuits are typically used in digital cameras for compensating for the blur in the input image, which is caused by the camera optics. The methods and circuits described herein can be used to reduce blur in any suitable optical system. In particular, high quality images can be produced using simpler, smaller and lower cost optics, which reduces the overall cost and size of the camera.

In some embodiments, a stream of input pixel values of a color input image is provided to an image enhancement, or image restoration circuit. The input stream typically comprises an interleaved pattern of pixel values of different colors, in accordance with the mosaic pattern used. The image enhancement circuit filters the pixel values of each color with a separate deconvolution kernel, so as to produce a single-color output sub-image for each color.

The deconvolution kernel coefficients are usually set to approximate the inverse of the point spread function (PSF) of the optics that caused the blur. Thus, deconvolving the input pixel values with the deconvolution kernel effectively compensates for the distortion caused by the optics. The enhanced single-color sub-images are then combined to produce a color output image, which has reduced blur in comparison with the input image.

Several alternative deconvolver configurations are described hereinbelow. Typically, the deconvolver comprises a plurality of multipliers, which are arranged in a two-dimensional array. The multipliers multiply the input pixel values by the appropriate deconvolution coefficients, and the multiplication results are accumulated to produce the total deconvolution result. In some embodiments, the multipliers operate at a clock rate that is higher than the pixel rate, thus reducing the number of multipliers used.

Some deconvolver configurations described herein use a pool of multipliers, which are assigned to perform deconvolution operations of different color pixels, in accordance with a predetermined multiplexing scheme. In some embodiments, the deconvolver has a pipelined configuration in which partial multiplication results are propagated across the multiplier array, so as to reduce the number of registers in the circuit.

In some embodiments, the image enhancement circuit uses different deconvolution kernels in different areas of the input image. Methods for reducing the number of stored deconvolution coefficients by exploiting symmetry are described below.

System Description

FIG. 1 is a block diagram that schematically illustrates an electronic imaging camera 20, in accordance with an embodiment of the present invention. The configuration of camera 20 is shown here by way of example, in order to clarify the principles of the present invention. These principles, however, are not limited to the configuration shown in FIG. 1, and may be applied in reducing the blur in imaging systems of other types in which the input image is divided into multiple interleaved sub-images of different colors, which are then combined to produce an enhanced color output image.

For example, camera 20 may be fitted in a mobile communication terminal, such as a mobile phone, or in an intra-body medical imaging device. Alternatively, camera 20 may be part of a security system, an automotive system, or any other suitable system or application.

In camera 20, objective optics 22 focuses light from an imaged scene or object onto a mosaic image sensor 24. Sensor 24 may comprise any suitable type of image sensor, such as a charge-coupled device (CCD) or a complementary metal oxide semiconductor (CMOS) image sensor. In the present example, as well as in the description that follows, the sensor is assumed to have a Bayer-type mosaic filter, so that each pixel 32 in the image signal output by the sensor is responsive to either red, green or blue light.

Thus, the images produced by the mosaic sensor can be viewed as comprising red, green and blue sub-images, made up of the pixel values of the corresponding sensor elements. The pixel values belonging to the different sub-images are typically interleaved in the output signal according to the order of the color elements in the mosaic filter. The sensor typically outputs one row of RGRGRG . . . (alternating red and green filters), followed by a succeeding row of GBGB GB . . . (alternating green and blue), and so forth in alternating lines. Alternatively, the methods and circuits described hereinbelow may be used, mutatis mutandis, with other types of mosaic sensor patterns.

The images produced by sensor 24, typically provided as a stream of pixel values, are received and processed by a digital restoration circuit 26. Several exemplary embodiments of this restoration circuit, which is also referred to as an image enhancement circuit, are described in detail hereinbelow. The pixel values are digitized prior to processing by circuit 26 by an analog-to-digital converter (not shown in the figures). Circuit 26 processes the red, green and blue input sub-images that are produced by sensor 24 in order to reduce the image blur, as described hereinbelow. Circuit 26 then outputs red, green and blue sub-images having reduced blur.

Typically, circuit 26 outputs the sub-images in the same format in which it received the sub-images from sensor 24. For example, circuit 26 may interleave the pixel values in the output sub-images to generate a single output stream, in which the pixel values have the same interleaving as the input pixel values from sensor 24. Alternatively, circuit 26 may be configured to demultiplex and output each sub-image as a separate data block or data stream.

An ISP 28 receives the deblurred red, green and blue output sub-images from circuit 26 and combines the sub-images to generate a color output image (or image sequence) in a standard image format. The output image may be displayed on a screen 30, transmitted over a communication link and/or stored in a memory.

Typically, restoration circuit 26 is embodied in an integrated circuit chip, which may comprise any suitable custom or semi-custom component. Although restoration circuit 26 and ISP 28 are shown as separate functional blocks in FIG. 1, the functions of the restoration circuit and the ISP may be implemented in a single integrated circuit component. Optionally, image sensor 24 may be combined with circuit 26 and possibly also ISP 28 on the same semiconductor substrate in a system-on-chip (SoC) or camera-on-chip design. Alternatively, some or all of the functions of restoration circuit 26 may be implemented in software on a programmable processor, such as a digital signal processor. This software may be downloaded to the processor in electronic form, or it may alternatively be provided on tangible media, such as optical, magnetic or electronic memory media.

Some additional aspects concerning the operation of camera 20, and in particular the operation of circuit 26, are described in PCT application PCT/IL2006/001294, filed Nov. 7, 2006, which is assigned to the assignee of the present patent application and is incorporated herein by reference.

Deconvolution in the Mosaic Space

Restoration circuit 26 reduces the blur in the input images by applying a separate and individual deconvolution filter to each input sub-image (i.e., to the pixel values associated with each different color). In other words, each input sub-image is converted into a corresponding output sub-image having reduced blur. For example, when the input image comprises green, red and blue input sub-images originating from a Bayer mosaic sensor, circuit 26 produces corresponding green, red and blue output sub-images.

The deconvolution operation determines the value of each output pixel by calculating a weighted sum of multiple input pixel values, having the same color as the output pixel in question, that surround the location of the output pixel. Typically, several tens of pixel values, which are located in a square that surrounds the output pixel, are weighted in the calculation. Alternatively, any other suitable number or geometrical arrangement of pixel values can also be used.

The weighting coefficients used in the deconvolution process form a two-dimensional filter response that is approximately inverse to the point spread function (PSF) of optics 22, in order to compensate for the distortion caused by the optics. Each set of filter coefficients is also referred to as a deconvolution kernel. Typically, separate deconvolution kernels are defined for the green, red and blue pixels.

Methods for computing deconvolution kernels of this sort are described, for example, in the above-mentioned WO 2004/063989 A2, as well as in U.S. patent application Ser. No. 11/278,255, filed Mar. 31, 2006, which is assigned to the assignee of the present patent application and whose disclosure is incorporated herein by reference.

FIG. 2 is a schematic illustration of green, red and blue deconvolution kernels, in accordance with an embodiment of the present invention. In the present example, the input image originates from a Bayer mosaic sensor. Thus, the input pixels alternate between green, red and blue pixels, in accordance with the Bayer mosaic pattern described above.

FIG. 2 shows three different sets of pixels that participate in the green, red and blue deconvolution kernels. The figure shows the locations of the different input pixels that contribute to the deconvolution of a particular output pixel. For example, the green pixels are denoted G, and the value of a particular green output pixel 40 (row 8, column 9) is determined based on the values of one-hundred and thirteen green pixels 44 that surround pixel 40.

The remaining pixels may be either red or blue. The value of a particular red or blue output pixel 48 (row 8, column 8) is determined based on the values of forty-nine pixels 52 of the same color that surround pixel 44. When pixel 48 comprises a red pixel, pixels 52 denoted R/B also comprise red pixels. In this case, the blue pixels are denoted B/R. When pixel 48 comprises a blue pixel, pixels 52 comprise the forty-nine surrounding blue pixels. In these cases, the pixels denoted B/R represent the red pixels.

Figures 3A, 3B:
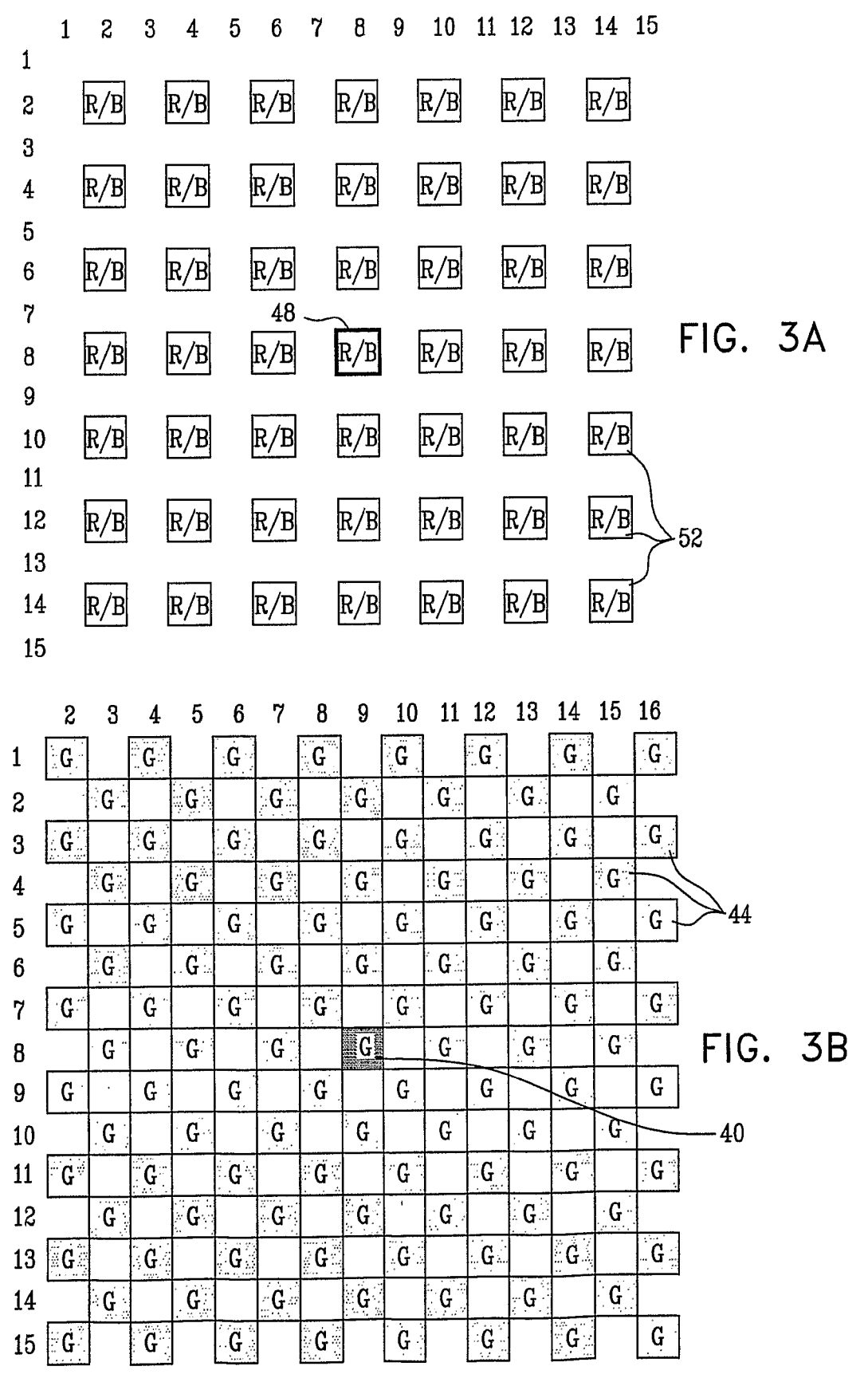

FIG. 3A shows the pixel locations that participate in the red and blue deconvolution kernels. As can be seen in the figure, input pixels 52 that contribute to the deconvolution of output R/B pixel 48 are located in every second row and in every second column. The remaining pixels comprise either green pixels or B/R pixels (i.e., blue pixels when pixel 48 is red, and vice versa).

FIG. 3B shows the pixel locations that participate in the green deconvolution kernel. Green input pixels 44 that contribute to the deconvolution of output pixel 40 are located in alternate positions in every row and column.

Image Restoration Circuit Configurations

FIG. 4 is a block diagram that schematically illustrates an image restoration circuit 60, which can be used as circuit 26 in FIG. 1 above, in accordance with an embodiment of the present invention. Circuit 60 comprises an input memory 64, which accepts and buffers the stream of input pixel values produced by sensor 24. Thus, memory 64 serves as an input interface of circuit 60. The input stream is provided to memory 64 at a certain pixel clock rate. The operation of circuit 60, and in particular of memory 64, is synchronized with the pixel clock.

The input image is scanned (i.e., written into memory 64) row by row, from top to bottom. Pixels are read out of memory 64 in successive vertical columns of fifteen pixels, advancing horizontally in every pixel clock cycle. In other words, if the output of memory 64 comprises pixels [j . . . j+14, i] (i.e., the i'th pixels of rows j to j+14) at a certain pixel clock cycle, at the next clock cycle the memory will output pixels [j . . . j+14, i+1]; i.e., the next fifteen-pixel column of the same rows. After the last column of rows j . . . j+14 is read from memory 60, reading continues at the beginning of the next row, and pixels [j+1 . . . j+15, 1] are output. Memory 60 is typically dimensioned to store fourteen pixel rows, although any other suitable memory size can also be used.

The output of memory 60 is provided to a green pixel deconvolver 68 and to a red/blue pixel deconvolver 72, which are controlled by a timing/selection unit 76. Deconvolver 68 deconvolves the green sub-image, i.e., the green input pixel values, using a set of one-hundred and thirteen coefficients stored in a green coefficient memory 80. Deconvolver 72 deconvolves the red and blue sub-images using two respective sets of forty-nine coefficients, which are stored in an R/B coefficient memory 84. Exemplary deconvolver configurations, which may be used to implement deconvolvers 68 and 72 are described further below.

As shown in FIGS. 2 and 3B above, green pixels are located in alternating positions in each column of the input image, and of the green deconvolution kernel. As shown in FIGS. 2 and 3A above, R/B pixels are located at fixed positions in every second column of the input image, and of the R/B deconvolution kernel. In order to control deconvolvers 68 and 72, timing/selection unit 76 toggles between two states in response to the pixel clock. In one state, unit 76 causes deconvolver 68 to load and latch the even-order pixel values in the fifteen-pixel column at its input. In the second state, unit 76 causes deconvolver 68 to load and latch the odd-order pixel values. In parallel, in one state, unit 76 causes deconvolver 72 to load and latch the seven even-ordered pixel values from the fifteen-pixel column at its input. In the second state, unit 76 causes deconvolver 72 not to load any pixel values. Unit 76 may be implemented using a toggle flip-flop device and/or any other suitable logic.

A multiplexer (MUX) 88, which is synchronized and controlled by unit 76, alternates between the outputs of deconvolvers 68 and 72 in every pixel clock cycle. As a result, the output of MUX 88 comprises a stream of output pixel values, which follows the same Bayer mosaic pattern of the input stream. Since the output sub-images are produced by deconvolving the respective input sub-images with sets of deconvolution coefficients, the level of blur and other optical distortion in the output sub-images is reduced with respect to the input sub-images.

The output pixel value stream is provided to ISP 28, which produces the combined color output images, as described above.

FIGS. 5A and 5B are block diagrams that schematically illustrate details of green pixel deconvolver 68, in accordance with an embodiment of the present invention. Deconvolver 68 comprises a two-dimensional array of sixty-four filter cells 92. The internal structure of cell 92 is described in FIG. 5B below. The sixty-four filter cells are arranged in an array of eight rows by eight columns.

The leftmost column of cells 92 is connected to the deconvolver input; i.e., accepts the fifteen-pixel columns read from memory 64, as described in FIG. 4 above. In each pixel clock cycle, each cell 92 accepts an even or odd pixel value from its left neighbor (or from the input, when the cell is the leftmost cell in the row), multiplies the pixel value by the appropriate deconvolution coefficient and produces the result at its output port (denoted P). At the same time, each cell (except for the cells at the rightmost column of the array) transfers the pixel value used in the previous clock cycle to its right neighbor in the array.

Each filter cell 92 performs a single multiplication in each pixel clock cycle. The deconvolution of each green pixel value is performed during two successive pixel clock cycles. If a given cell 92 processed an even-order pixel value during the first clock cycle, it will process an odd-order pixel value in the second clock cycle, and vice versa, as the pixel values traverse the array. Thus, the total deconvolution result (i.e., the value of the corresponding green output pixel) is equal to the sum of all outputs P of all cells 92, aggregated over the two clock cycles.

Deconvolver 68 comprises a 64-input adder 96, which sums the outputs of the sixty-four outputs P of cells 92. In some embodiments, adder 96 has a pipelined internal structure, although any suitable adder can be used. The outputs of adder 96 in the two successive clock cycles are accumulated by a register 100 and an adder 104. In the first clock cycle, the output of adder 96 (i.e., a partial deconvolution result) is latched by register 100. At the second clock cycle, adder 104 sums the output of adder 96 with the value of register 100 to produce the total deconvolution result.

FIG. 5B is a block diagram that schematically illustrates the internal structure of filter cell 92, in accordance with an embodiment of the present invention. Even and odd input pixel values are loaded alternately into an even pixel latch 108 and an odd pixel latch 112, respectively. The pixel values are loaded from the left neighbor of the cell in the array, or, when the cell is the leftmost cell in its row, from memory 64.

The corresponding deconvolution coefficients are loaded from memory 80 into an even coefficient register 116 and an odd coefficient register 120. Any suitable method can be used to read the appropriate coefficients. Two switches 124 and 128, which are controlled by unit 76, select whether to multiply the even or the odd pixel value at each pixel clock cycle. Switches 124 and 128 typically comprise CMOS multiplexers.

In some embodiments, the loading of pixel values and the multiplication operation are performed in parallel. In these embodiments, even-order pixel values are multiplied during clock cycles in which odd-order pixel values are loaded, and vice versa. A multiplier 132 multiplies the appropriate pixel value by the corresponding deconvolution coefficient, and outputs the result on output P of the filter cell. The multiplier operates at the pixel clock rate, i.e., performs a single multiplication in each pixel clock cycle.

In some embodiments, the deconvolution coefficients are represented using signed 10-bit representation, the input pixels are represented using unsigned 10-bits, and the multipliers comprise signed 10-bit by unsigned 10-bit multipliers. The multiplier outputs (in these as well as in other embodiments) may be expressed using signed 20 bits. In alternative embodiments, however, any other suitable quantization can be used.

In some embodiments, different coefficients can be represented using different bit numbers. For example coefficients at the center of the deconvolution kernel may be represented with higher accuracy (i.e., a higher number of bits) in comparison with coefficients located further away from the center. In these embodiments, the multipliers can also be implemented with non-uniform bit numbers. Using non-uniform quantization enables reducing the size and cost of the circuit.

FIG. 6A is a block diagram that schematically illustrates details of red/blue pixel deconvolver 72, in accordance with an embodiment of the present invention. Deconvolver 72 comprises twenty-eight filter cells 144, arranged in a two-dimensional array of four rows by seven columns. Each cell 144 accepts two input R/B pixel values, either from its left neighbor or from memory 64, multiplies the two pixel values by the appropriate deconvolution coefficients, and outputs the result at its output port P. Each cell 144 (except the cells at the rightmost column of the array) also transfers the previous input pixel values to its right neighbor.

The loading and propagation of the pixel values across the array are controlled by unit 76, as described in FIG. 4 above. Since R/B pixels are located only in every second column of the image, the deconvolution of each R/B pixel value is performed during two successive pixel clock cycles. Deconvolver 72 comprises a 28-input adder 148, which sums the outputs of the twenty-eight outputs P of cells 144. The outputs of adder 148 in the two successive clock cycles are accumulated by a register 152 and an adder 156, similar to register 100 and adder 104 of FIG. 5A above. In the first clock cycle, the output of adder 148 is latched by register 152. At the second clock cycle, the output of adder 148 is added by adder 156 to the value of register 152 to produce the total deconvolution result.

FIG. 6B is a block diagram that schematically illustrates the internal structure of filter cell 144, in accordance with an embodiment of the present invention. Two even input pixel values are loaded into two even pixel latches 160 and 164. Unlike the green pixel filter cell configuration of FIG. 5B above, in the present configuration both latches are latched simultaneously and not alternately. On the other hand, pixel values are loaded only in every second pixel clock cycle. The pixel values are loaded from the left neighbor of the cell in the array, or, when the cell is the leftmost cell in its row, from memory 64.

The corresponding deconvolution coefficients are loaded from memory 84 into two coefficient registers 168 and 172. Any suitable method can be used to read the appropriate coefficients. Two switches 176 and 180, which are controlled by unit 76, select one of the two even-order pixel values to be multiplied at each pixel clock cycle. Switches 176 and 180 are similar to switches 124 and 128 of FIG. 5B above. A multiplier 184 multiplies the appropriate pixel value by the corresponding deconvolution coefficient, and outputs the result on output P of the filter cell. Multiplier 184 operates at the pixel clock rate.

The filter cell configurations of FIGS. 5A, 5B, 6A and 6B assume that all cells 92 are identical to one another, and that all cells 144 are identical to one another. In alternative embodiments, some of the filter cells can be simplified in order to reduce the cost and size of circuit 60. For example, the filter cells in the bottom row of the array, both in deconvolver 68 and in deconvolver 72, process only a single pixel value. These filter cells can be replaced by filter cells having only a single pixel latch, a single coefficient register, a multiplier and no switches.

As another example, filter cells 92 in the rightmost column of the array of FIG. 5A also process only a single pixel value. These filter cells can also be implemented using a simpler configuration, which comprises only a single pixel latch, a single coefficient register, a multiplier and no switches.

Additionally, the multipliers in the filter cells of the bottom row and rightmost column of deconvolver 68, and in the bottom row of deconvolver 72, are utilized during only 50% of the time. As such, pairs of filter cells in these rows/columns can share a single multiplier. Using this technique, the number of multipliers in deconvolver 68 can be reduced from sixty-four to fifty-seven, and in deconvolver 72 from twenty-eight to twenty-five.

The configuration of circuit 60 described above is an exemplary configuration. Any other suitable configuration may be used. For example, the size of memory 64 and the number of filter cells 92 and 144 in deconvolvers 68 and 72 were chosen to match the 15×15 pixel deconvolution kernels used. When a different kernel size is used, the input memory and deconvolver configuration can be modified accordingly. The deconvolver configuration can also be modified to suit other mosaic patterns.

FIG. 7 is a block diagram that schematically illustrates an image restoration circuit 190, in accordance with another embodiment of the present invention. The overall configuration of circuit 190 is similar to circuit 60 of FIG. 4 above and, like circuit 60, circuit 190 can be used to implement circuit 26 in FIG. 1 above. Some components of circuit 190, such as memories 64, 80 and 84 and MUX 88, are similar to the corresponding components of circuit 60.

In circuit 190, however, the deconvolver multipliers operate at a clock rate that is double the clock rate of the multipliers of deconvolvers 68 and 72. As a result, the number of multipliers is reduced, and the cost and size of the circuit decreases accordingly.

Circuit 190 comprises a green pixel deconvolver 194 and a red/blue pixel deconvolver 198, which are described in greater detail in FIGS. 8 and 9 below, respectively. A four-phase timing unit 202 produces a four-phase timing signal in each period of two consecutive pixel clock cycles. The timing signal is used to control and synchronize the higher clock rate operation of the two deconvolvers. The four-phase timing signal can be provided to deconvolvers 194 and 198 using four discrete lines. Alternatively, unit 202 can encode the four phases over two lines, or perform any other suitable encoding that enables the deconvolvers to differentiate between the four distinct phases of the timing signal.

FIG. 8 is a block diagram that schematically illustrates details of green pixel deconvolver 194, in accordance with an embodiment of the present invention. Deconvolver 194 comprises thirty-two filter cells 206, arranged in a two-dimensional array of four rows by eight columns. Each filter cell 206 processes a column of four input pixel values and four corresponding deconvolution coefficients.

Each cell 206 comprises a single multiplier, which operates at twice the pixel clock rate. During each phase of the four-phase timing signal provided by unit 202, the multiplier multiplies a single input pixel value by a single coefficient, and produces the result at output P of the cell. Thus, each cell 206 performs four multiplications during every two consecutive pixel clock cycles. In comparison with filter cells 92 of FIG. 5A above, each filter cell 206 functions similarly to two cells 92. The total number of multipliers in deconvolver 194 is thirty-two, half the number of multipliers in deconvolver 68.

The thirty-two outputs P of cells 206 are summed by a 32-input adder 210. An adder 214 and a register 218, arranged in a feedback configuration, accumulate the partial sums produced by adder 210 during the four clock phases. Register 218 is initially cleared at the first clock phase, and then, at each consecutive clock cycle, adds the next output from adder 210 to register 218. At the end of the fourth clock phase, the output of adder 214 is equal to the desired deconvolution result, i.e., the value of a deconvolved green pixel.

The following table illustrates the accumulation operation of adder 210, adder 214 and register 218:

| Clock phase | Adder 210 output | Register 218 output | Adder 214 (total) output |
|---|---|---|---|
| 1 | P1 | 0 | P1 |
| 2 | P2 | P1 | P1 + P2 |
| 3 | P3 | P1 + P2 | P1 + P2 + P3 |
| 4 | P4 | P1 + P2 + P3 | P1 + P2 + P3 + P4 |

FIG. 9 is a block diagram that schematically illustrates details of red/blue pixel deconvolver 198, in accordance with an embodiment of the present invention. Deconvolver 198 comprises fourteen filter cells 222, arranged in a two-dimensional array of two rows by seven columns. Each cell 222 comprises a single multiplier, which operates at twice the pixel clock rate. Each multiplier multiplies four input pixel values by the corresponding deconvolution coefficients during the four clock phases provided by unit 202. The total number of multipliers in deconvolver 198 is fourteen, in comparison with the twenty-eight multipliers of deconvolver 72 of FIG. 6A above.

A 14-input adder 226 sums the fourteen outputs P of cells 222 in each of the four clock phases. An adder 230 and a register 234 accumulate the four partial results to produce the total deconvolution result, similarly to adder 214 and register 218 of FIG. 8 above.

FIG. 10 is a block diagram that schematically illustrates a deconvolution filter cell 238, in accordance with an embodiment of the present invention. Filter cell 238 can be used as cell 206 in deconvolver 194 of FIG. 8 above, or as cell 222 in deconvolver 198 of FIG. 9 above. In cell 238, four registers 242 latch the values of four neighboring vertical input pixels. The odd-order pixels are latched at phase 1, and the even-order pixels are latches at phase 3 of the four-phase signal provided by unit 202.

The four corresponding deconvolution coefficients are stored in coefficient registers 246. Any suitable method can be used to load the appropriate coefficients from memory 80 or 84. Two 4-input multiplexers 250 sequentially select a single pixel value from registers 242, and a corresponding coefficient value from registers 246, during each of the four phases of the timing signal of unit 202. At each phase, the selected pixel value and coefficient value are provided to a multiplier 254. The multiplier multiplies the pixel value with the coefficient, and outputs the result at the cell output P.

Shared Multiplier Configuration

Figure 11:
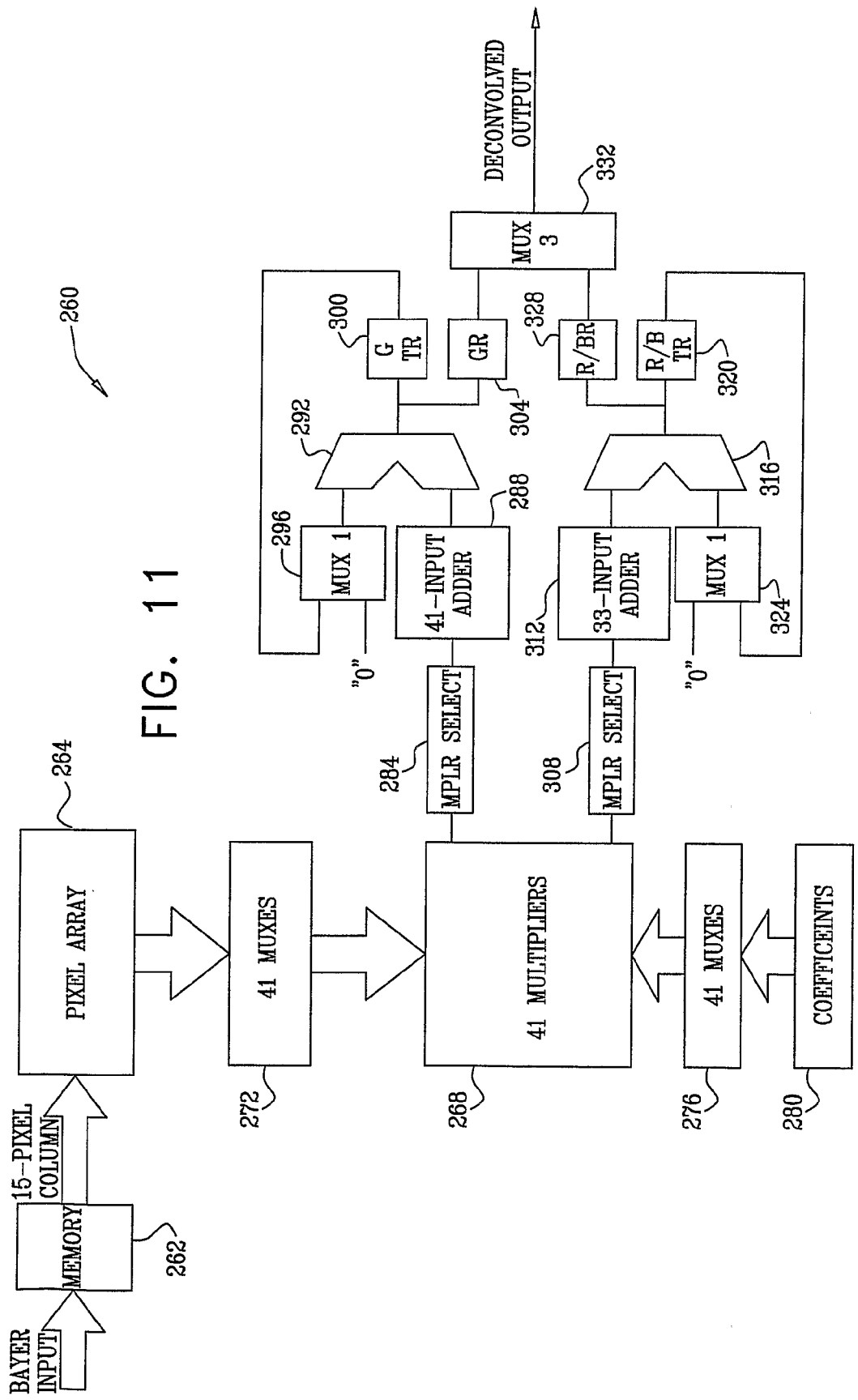
FIG. 11 is a block diagram that schematically illustrates an image restoration circuit, in accordance with another embodiment of the present invention.

FIG. 11 is a block diagram that schematically illustrates an image restoration circuit 260, in accordance with another embodiment of the present invention. Unlike the image restoration circuits described above, the multipliers in circuit 260 are shared between the green and red/blue pixel deconvolution processes. This sharing of multipliers enables further reduction in the number of multipliers, and thus in the cost of the image restoration circuit.

As described above, the number of multiplications performed in the deconvolution of a single green pixel is 7*7+8*8=113, and the number of multiplications performed in the deconvolution of a red/blue pixel is 7*7=49. The total number of multiplications in any two successive pixel clock cycles is thus 113+49=162.

Circuit 260 comprises forty-one multipliers, which operate at a clock rate that is double the pixel clock rate. In every two successive pixel clock cycles, the circuit performs the 162 multiplications by assigning multipliers to coefficient/pixel pairs, in accordance with a predetermined assignment scheme. Each of the forty-one multipliers performs four multiplications in every two successive pixel clock cycles. At this clock rate, forty-one is the minimum possible number of multipliers, since CEILING(162/4)=41.

The input pixel stream is stored in an input memory 262, similar to memory 64 of FIG. 4 above, and is read in 15-pixel vertical columns. A 4-phase timing unit (not shown in the figure), which is similar to unit 202 of FIG. 7 above, produces a four-phase timing signal at twice the pixel clock rate. In other words, the signal alternates between four phases in every two pixel clock cycles.

A pixel array 264 holds a matrix of 15×15 pixels. The pixel values in the pixel array are shifted to the right every two phases of the timing signal, i.e., whenever a new pixel column is read from memory 262.

A multiplier bank 268 comprises forty-one multipliers. Each multiplier performs a single multiplication in each phase of the 4-phase timing signal. A pixel multiplexer bank 272, which comprises forty-one 4-input multiplexers, provides each multiplier with the appropriate pixel value from pixel array 264 during each phase of the 4-phase timing signal. A coefficient multiplexer bank 276, which also comprises forty-one 4-input multiplexers, provides each multiplier with the corresponding deconvolution coefficient. The deconvolution coefficient values are stored in a coefficient memory 280. Thus, one input of each multiplier in bank 268 is connected to a multiplexer in bank 272, and the other multiplier input is connected to a multiplexer in bank 276.

Each of the forty-one multipliers is assigned to multiply a particular pixel value (which may be either green or red/blue) by a particular coefficient value at each of the four phases of the timing signal. Any suitable assignment of multipliers to pixel values and coefficients can be used. The following two tables describe an exemplary multiplier assignment scheme, which simplifies and minimizes the routing paths in the circuit, and consequently the circuit power consumption. The tables specify which pixel value (i.e., row and column in pixel array 264) is assigned to each multiplier at each of the four clock phases. The tables also indicate whether each pixel is green or red/blue.

| Mplr | Phase 1 | | | Phase 2 | | |
|---|---|---|---|---|---|---|
| | row | column | color | row | column | color |
| 1 | 1 | 1 | G | 2 | 3 | R/B |
| 2 | 3 | 1 | G | 4 | 3 | R/B |
| 3 | 5 | 1 | G | 6 | 3 | R/B |
| 4 | 7 | 1 | G | 9 | 1 | G |
| 5 | 8 | 14 | G | 8 | 3 | R/B |
| 6 | 11 | 1 | G | 10 | 3 | R/B |
| 7 | 13 | 1 | G | 12 | 3 | R/B |
| 8 | 15 | 1 | G | 14 | 3 | R/B |
| 9 | 14 | 5 | R/B | 2 | 5 | R/B |
| 10 | 4 | 5 | R/B | 4 | 7 | R/B |
| 11 | 10 | 5 | R/B | 6 | 5 | R/B |
| 12 | 12 | 5 | R/B | 12 | 7 | R/B |
| 13 | 1 | 5 | G | 2 | 7 | R/B |
| 14 | 6 | 7 | R/B | 6 | 11 | R/B |
| 15 | 8 | 7 | R/B | 8 | 11 | R/B |
| 16 | 10 | 7 | R/B | 10 | 11 | R/B |
| 17 | 13 | 5 | G | 14 | 7 | R/B |
| 18 | 1 | 9 | G | 3 | 9 | G |
| 19 | 14 | 9 | R/B | 2 | 9 | R/B |
| 20 | 4 | 9 | R/B | 6 | 9 | R/B |
| 21 | 5 | 11 | G | 5 | 9 | G |
| 22 | 7 | 11 | G | 7 | 9 | G |
| 23 | NOT USED | | | 8 | 9 | R/B |
| 24 | 9 | 11 | G | 9 | 9 | G |
| 25 | 12 | 9 | R/B | 10 | 9 | R/B |
| 26 | 11 | 11 | G | 11 | 9 | G |
| 27 | 13 | 9 | G | 15 | 9 | G |
| 28 | 1 | 11 | G | 2 | 11 | R/B |
| 29 | 4 | 11 | R/B | 4 | 13 | R/B |
| 30 | 12 | 11 | R/B | 12 | 13 | R/B |
| 31 | 13 | 11 | G | 14 | 11 | R/B |
| 32 | 14 | 13 | R/B | 2 | 13 | R/B |
| 33 | 10 | 13 | R/B | 6 | 13 | R/B |
| 34 | 8 | 5 | R/B | 8 | 13 | R/B |
| 35 | 1 | 13 | G | 2 | 14 | G |
| 36 | 3 | 13 | G | 4 | 14 | G |
| 37 | 5 | 13 | G | 6 | 14 | G |
| 38 | 7 | 13 | G | 9 | 13 | G |
| 39 | 11 | 13 | G | 10 | 14 | G |
| 40 | 13 | 13 | G | 12 | 14 | G |
| 41 | 15 | 13 | G | 14 | 14 | G |

| Mplr | Phase 3 | | | Phase 4 | | |
|---|---|---|---|---|---|---|
| | row | column | color | row | column | color |
| 1 | 1 | 2 | G | 2 | 1 | G |
| 2 | 4 | 1 | G | 3 | 2 | G |
| 3 | 5 | 2 | G | 6 | 1 | G |
| 4 | 7 | 2 | G | 9 | 2 | G |
| 5 | 8 | 14 | R/B | 8 | 1 | G |
| 6 | 11 | 2 | G | 10 | 1 | G |
| 7 | 13 | 2 | G | 12 | 1 | G |
| 8 | 15 | 3 | G | 14 | 1 | G |
| 9 | 14 | 3 | G | 2 | 3 | G |
| 10 | 4 | 3 | G | 4 | 5 | G |
| 11 | 10 | 3 | G | 6 | 3 | G |
| 12 | 12 | 3 | G | 12 | 5 | G |
| 13 | 2 | 5 | G | 3 | 4 | G |
| 14 | 6 | 5 | G | 6 | 9 | G |
| 15 | 8 | 5 | G | 8 | 9 | G |
| 16 | 10 | 5 | G | 10 | 9 | G |
| 17 | 15 | 4 | G | 14 | 5 | G |
| 18 | 1 | 6 | G | 3 | 6 | G |

-continued

| | Phase 3 | | | Phase 4 | | |
|---|---|---|---|---|---|---|
| Mplr | row | column | color | row | column | color |
| 19 | 14 | 7 | G | 2 | 7 | G |
| 20 | 4 | 7 | G | 6 | 7 | G |
| 21 | 5 | 6 | G | 5 | 4 | G |
| 22 | 7 | 6 | G | 7 | 4 | G |
| 23 | NOT USED | | | 8 | 7 | G |
| 24 | 9 | 6 | G | 9 | 4 | G |
| 25 | 12 | 7 | G | 10 | 7 | G |
| 26 | 11 | 6 | G | 11 | 4 | G |
| 27 | 13 | 6 | G | 15 | 6 | G |
| 28 | 3 | 10 | G | 2 | 9 | G |
| 29 | 4 | 9 | G | 4 | 11 | G |
| 30 | 12 | 9 | G | 12 | 11 | G |
| 31 | 15 | 10 | G | 14 | 9 | G |
| 32 | 14 | 11 | G | 2 | 11 | G |
| 33 | 10 | 11 | G | 6 | 11 | G |
| 34 | 8 | 3 | G | 8 | 11 | G |
| 35 | 1 | 14 | G | 2 | 14 | R/B |
| 36 | 3 | 14 | G | 4 | 14 | R/B |
| 37 | 5 | 14 | G | 6 | 14 | R/B |
| 38 | 7 | 14 | G | 9 | 14 | G |
| 39 | 11 | 14 | G | 10 | 14 | R/B |
| 40 | 13 | 14 | G | 12 | 14 | R/B |
| 41 | 15 | 14 | G | 14 | 14 | R/B |

The multiplexing scheme defined by the two tables above assumes that the first pixel in each row of array 264 is a green pixel. When the first pixel in the row is an R/B pixel, the multiplier assignment is modified slightly by selecting the R/B pixels two columns to the right.

In order to produce the deconvolution result, the one-hundred and sixty-two multiplication results performed by the forty-one multipliers during the four clock phases should be accumulated properly. All multiplier outputs that correspond to the green pixel should be accumulated to produce the green output pixel value. Similarly, all outputs corresponding to the red/blue pixel should be accumulated to produce the red/blue output pixel value.

A green pixel selection block 284 selects the multiplier outputs corresponding to the green pixel, in each of the four clock phases. (In the two multiplexing tables above, the multiplier outputs corresponding to the green pixel are marked as "G.") The output of block 284 is summed by a 41-input adder 288, which produces a partial sum of the green pixel values in each of the four clock phases. The four partial results produced by adder 288 are accumulated by an accumulation circuit, which comprises an adder 292, a register 300 and a multiplexer 296. At the end of the four clock phases, the total deconvolved green pixel value is stored in a register 304.

A similar process is applied to the multiplication results corresponding to the R/B pixel. An R/B pixel selection block 308 selects the multiplier outputs corresponding to the R/B pixel (the multiplier outputs marked as "R/B" in the multiplexing tables above). The output of block 308 is summed by a 33-input adder 312, which produces four partial sums of the R/B pixel value in each of the four clock phases. The four partial results are accumulated by an accumulation circuit, which comprises an adder 316, a register 320 and a multiplexer 324. At the end of the four clock phases, the total deconvolved R/B pixel value is stored in a register 328. A multiplexer 332 alternately selects the outputs of registers 304 and 328 in each pixel clock cycle, to produce the Bayer mosaic output pixel stream.

Note that although in FIG. 11 adder 288 comprises a 41-input adder and adder 312 comprises a 33-input adder, adders having fewer inputs can also be used at the expense of higher-complexity multiplexing and wiring. In the exemplary multiplier assignment tables given above, at each phase of the four-phase timing signal there are at most thirty-nine multiplier outputs (at phase 3) that correspond to green pixels and at most twenty-seven outputs (at phase 2) that correspond to R/B pixels. Thus, given the appropriate multiplexing, adder 288 may comprise a 39-input adder and adder 312 may comprise a 27-input adder.

In summary, the circuit configuration of FIG. 11 carries out the functions of both green and red/blue pixel deconvolution using a bank of forty-one multipliers, each operating at twice the pixel clock rate.

Pipelined Deconvolver Configurations

In the image restoration circuit configurations described above, the deconvolution of each output pixel is calculated by multiplying the appropriate input pixel values by the corresponding deconvolution coefficients, and accumulating the products. The incoming input pixel values are stored in registers, such as in memory 64. When the deconvolution kernel is 15×15 pixels in size, for example, one hundred and sixty two registers are used to store the input pixel values at any given time.

In some embodiments, the number of registers needed for storing input pixel values is reduced by using a pipelined deconvolver configuration. Reducing the number of registers reduces the die area, and thus the cost of the image restoration circuit.

In the pipelined configurations described below, the deconvolver calculates the contribution of each column of incoming pixel values to fifteen partial deconvolution results. As a result, only the partial deconvolution results, and not the individual input pixel values, are stored. In parallel, the deconvolver accumulates previous partial results and outputs the total deconvolution results.

Obviously, the number of partial results is considerably smaller than the number of individual pixel values, thus significantly reducing the number of registers in the circuit.

Figure 12:
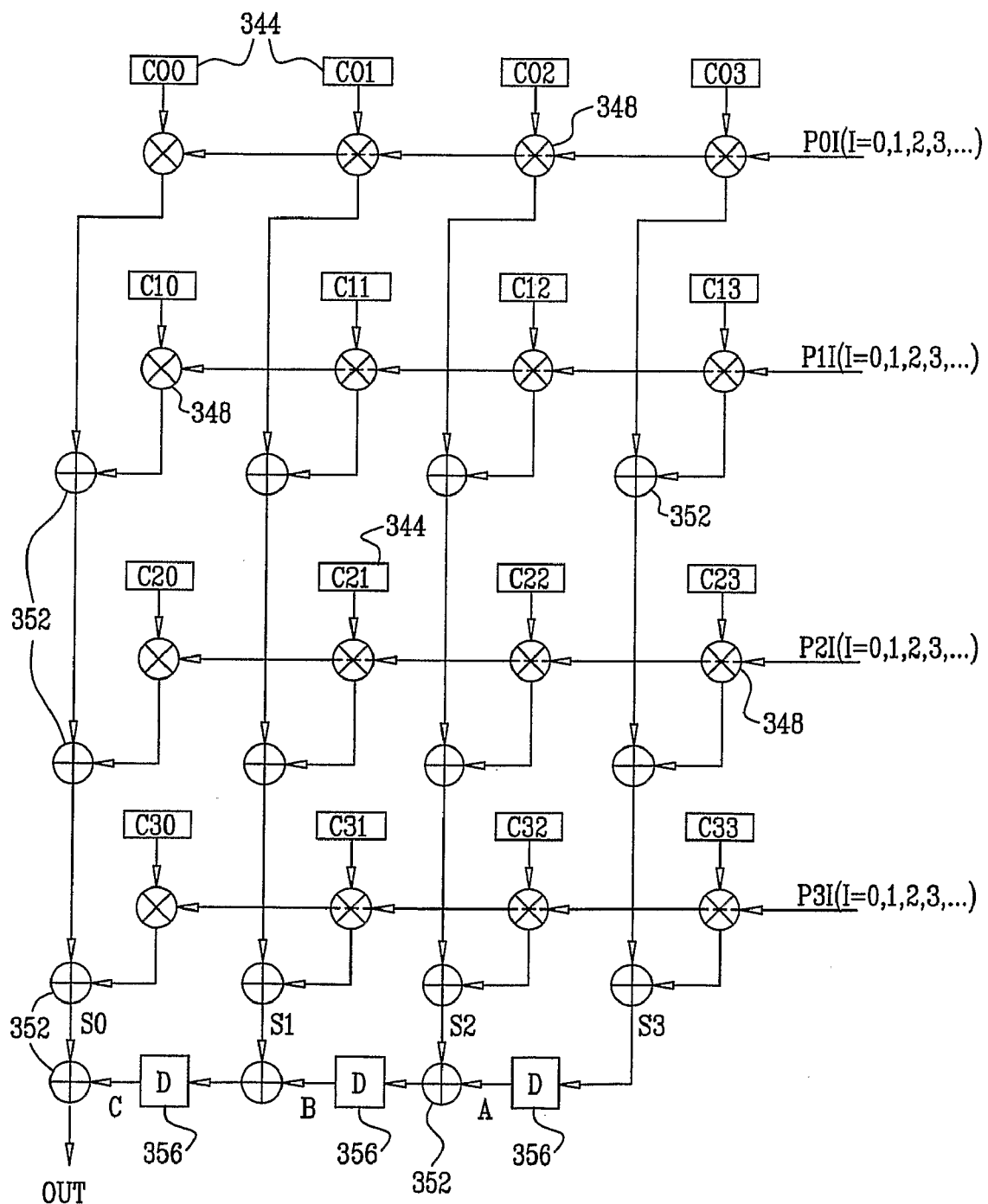
FIG. 12 is a block diagram that schematically illustrates a pipelined deconvolver, in accordance with an embodiment of the present invention.

FIG. 12 is a block diagram that schematically illustrates a pipelined deconvolver 340, in accordance with an embodiment of the present invention. Deconvolver 340 comprises sixteen multipliers arranged in a two-dimensional, four-by-four array. This simplified configuration is shown to demonstrate and clarify the principles of pipelined deconvolution.

Successive four-pixel columns enter the deconvolver from the right, at the pixel clock rate. The pixel value columns are denoted $(P0_i, P1_i, P2_i, P3_i)^T$, wherein i=0, 1, 2, 3 ... denotes pixel clock cycles. The deconvolver filters the incoming pixel values using a kernel of sixteen coefficients, stored in coefficient registers 344. The coefficients are denoted Cmn, m,n= 0...3. Each coefficient register is coupled to a multiplier 348, which operates at the pixel clock rate.

Each incoming pixel value is provided simultaneously to all multipliers in its row. For example, input pixel value $P1_i$ is provided simultaneously to all four multipliers of the second row; i.e., the multipliers coupled to coefficients C10, C11, C12 and C13. In each clock cycle, each multiplier multiplies the input pixel value at its input by the coefficient coupled to the multiplier.

The multiplication products in each multiplier column are accumulated by adders 352. The sum of multiplication products of the leftmost column of the array is denoted S0. Similarly, the accumulated products of the other columns are denoted S1, S2 and S3.

The column sums are aggregated using a horizontal delay line, in order to correctly accumulate the partial contributions of each pixel. (The array processes pixel values belonging to different pixels simultaneously. For example, when column sum S0 refers to the output of pixel i, the next column sum S1 refers to the output of pixel i+1. Therefore, column sum S1 is delayed by one clock cycle with respect to S0.) The delay line comprises delay lines 356, each delaying its input by a single pixel clock cycle. The column sums are delayed and summed to produce the deconvolution result denoted OUT. The delayed partial results at the outputs of delay lines 356 are denoted A, B and C.

In each pixel clock cycle, deconvolver 340 calculates partial deconvolution results belonging to four different pixels. Each of the partial deconvolution results S0 . . . S3 belongs to a different pixel.

The operation of the pipelined deconvolver is demonstrated by the following tables, which show the values of column sums S0 . . . S3, points A, B, C and OUT, during six successive pixel clock cycles. The summation operations (denoted Σ) in the tables are over i=0 . . . 3.

| Clock | Input | S0 | S1 | S2 | S3 |
|---|---|---|---|---|---|
| 1 | $P0_0 \ldots P3_0$ | $\Sigma Pi_0 \cdot Ci0$ | $\Sigma Pi_0 \cdot Ci1$ | $\Sigma Pi_0 \cdot Ci2$ | $\Sigma Pi_0 \cdot Ci3$ |
| 2 | $P0_1 \ldots P3_1$ | $\Sigma Pi_1 \cdot Ci0$ | $\Sigma Pi_1 \cdot Ci1$ | $\Sigma Pi_1 \cdot Ci2$ | $\Sigma Pi_1 \cdot Ci3$ |
| 3 | $P0_2 \ldots P3_2$ | $\Sigma Pi_2 \cdot Ci0$ | $\Sigma Pi_2 \cdot Ci1$ | $\Sigma Pi_2 \cdot Ci2$ | $\Sigma Pi_2 \cdot Ci3$ |
| 4 | $P0_3 \ldots P3_3$ | $\Sigma Pi_3 \cdot Ci0$ | $\Sigma Pi_3 \cdot Ci1$ | $\Sigma Pi_3 \cdot Ci2$ | $\Sigma Pi_3 \cdot Ci3$ |
| 5 | $P0_4 \ldots P3_4$ | $\Sigma Pi_4 \cdot Ci0$ | $\Sigma Pi_4 \cdot Ci1$ | $\Sigma Pi_4 \cdot Ci2$ | $\Sigma Pi_4 \cdot Ci3$ |
| 6 | $P0_5 \ldots P3_5$ | $\Sigma Pi_5 \cdot Ci0$ | $\Sigma Pi_5 \cdot Ci1$ | $\Sigma Pi_5 \cdot Ci2$ | $\Sigma Pi_5 \cdot Ci3$ |

| Clock | A | B | C | OUT |
|---|---|---|---|---|
| 1 | X | X | X | X |
| 2 | $\Sigma Pi_0 \cdot Ci3$ | X | X | X |
| 3 | $\Sigma Pi_1 \cdot Ci3$ | $\Sigma Pi_0 \cdot Ci3 + \Sigma Pi_1 \cdot Ci2$ | X | X |
| 4 | $\Sigma Pi_2 \cdot Ci3$ | $\Sigma Pi_1 \cdot Ci3 + \Sigma Pi_2 \cdot Ci2$ | $\Sigma Pi_0 \cdot Ci3 + \Sigma Pi_1 \cdot Ci2 + \Sigma Pi_2 \cdot Ci1$ | $\Sigma Pi_0 \cdot Ci3 + \Sigma Pi_1 \cdot Ci2 + \Sigma Pi_2 \cdot Ci1 + \Sigma Pi_3 \cdot Ci0$ |
| 5 | $\Sigma Pi_3 \cdot Ci3$ | $\Sigma Pi_2 \cdot Ci3 + \Sigma Pi_3 \cdot Ci2$ | $\Sigma Pi_1 \cdot Ci3 + \Sigma Pi_2 \cdot Ci2 + \Sigma Pi_3 \cdot Ci1$ | $\Sigma Pi_1 \cdot Ci3 + \Sigma Pi_2 \cdot Ci2 + \Sigma Pi_3 \cdot Ci1 + \Sigma Pi_4 \cdot Ci0$ |
| 6 | $\Sigma Pi_4 \cdot Ci3$ | $\Sigma Pi_3 \cdot Ci3 + \Sigma Pi_4 \cdot Ci2$ | $\Sigma Pi_2 \cdot Ci3 + \Sigma Pi_3 \cdot Ci2 + \Sigma Pi_4 \cdot Ci1$ | $\Sigma Pi_2 \cdot Ci3 + \Sigma Pi_3 \cdot Ci2 + \Sigma Pi_4 \cdot Ci1 + \Sigma Pi_5 \cdot Ci0$ |

As can be seen in the tables, outputs A, B, C and OUT are initially undefined, and their value is denoted X. With every clock cycle, the outputs begin to fill, until all outputs produce legitimate values at the fourth clock cycle. From this stage, the output of the deconvolver is equal to $$OUT_k = \sum_{j=0}^{3} \sum_{i=0}^{3} Pi_{k+j-3} * Ci, 3-j,$$

wherein k denotes the index of the incoming pixel column. As can be seen from the equation above, $OUT_k$ is indeed equal to the deconvolution of the incoming pixels P using deconvolution coefficients C.

Figure 13:
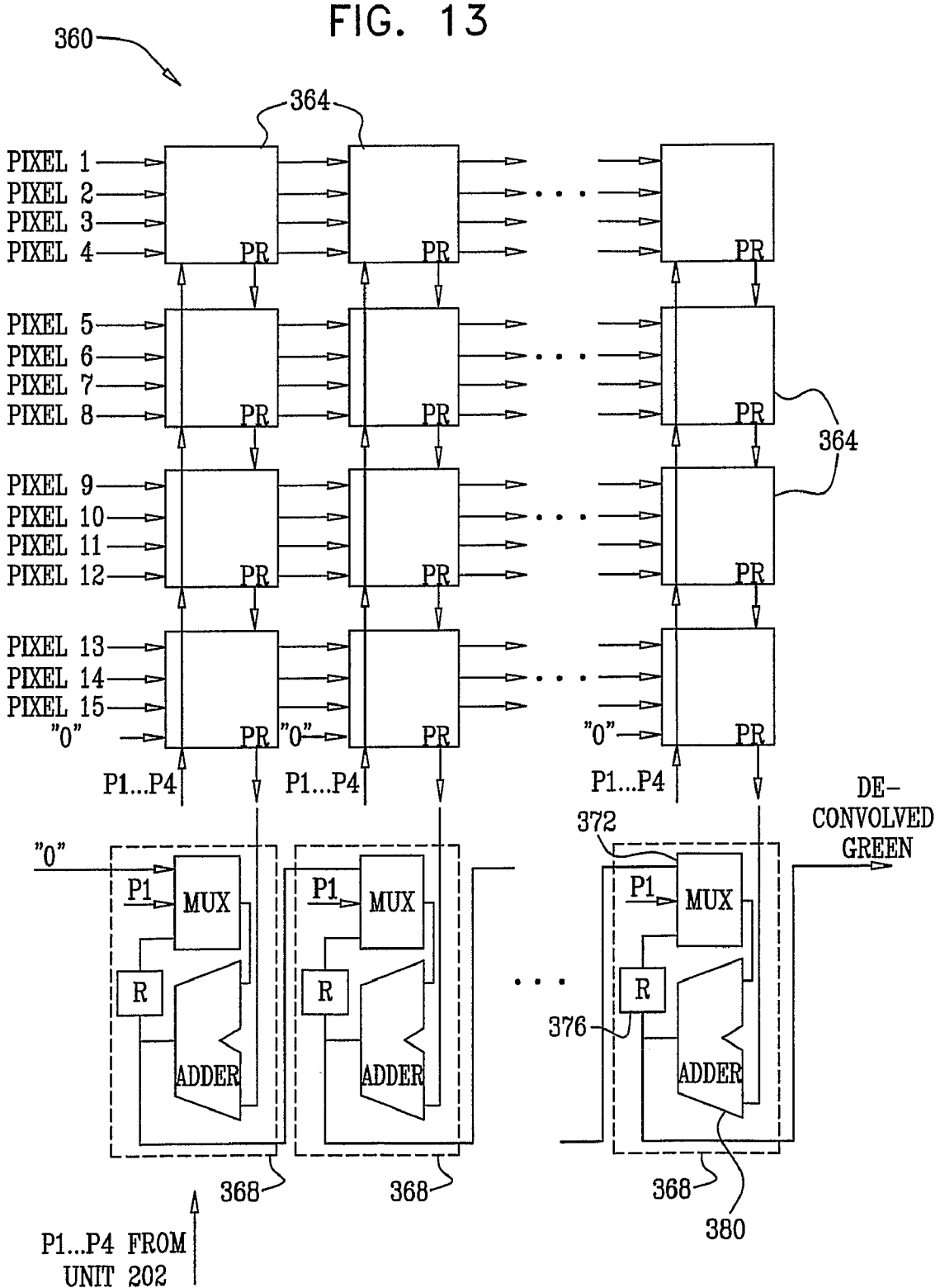
FIG. 13 is a block diagram that schematically illustrates a green pixel pipelined deconvolver, in accordance with an embodiment of the present invention.

FIG. 13 is a block diagram that schematically illustrates a green pixel pipelined deconvolver 360, in accordance with an embodiment of the present invention. Deconvolver 360 comprises sixteen filter cells 364, each of which operates at twice the pixel clock rate and processes four deconvolution coefficients. Thus, deconvolver 360 can be used instead of deconvolver 194 in circuit 190 of FIG. 7 above. The internal structure of filter cell 364 is described in FIG. 15 below.

Deconvolver 360 has a pipelined configuration similar to the configuration of FIG. 12 above. Each filter cell 364 produces a partial result (denoted PR) and provides it to the next lower filter cell in its column. Each filter cell, which accepts a partial result from a neighbor cell, adds the accepted partial result to its own multiplication result before forwarding the combined result to the next cell down the column.

The partial results of each column of cells are accumulated by serial adders 368. Each serial adder 368 accumulates the partial results of the cells in its column during the four clock phases of each two successive pixel clock cycles. Each serial adder 368 transfers its output to the next serial adder on its right, where the result is added to the partial result of the next column. The rightmost serial adder produces the total deconvolution result.

Each serial adder 368 comprises a multiplexer 372, a register 376 and an adder 380. Multiplexer 372 routes the output of the left-hand-side neighbor column to the second input of adder 380 during the first clock phase. During the other three, multiplexer 372 routes the output of register 376 to this input. In multiplexer 372 of the leftmost serial adder, a zero value is routed to the adder during the first phase. The pipeline delay between adjacent serial adders is four phases, i.e., two pixel clock cycles. This delay corresponds to the gap between two consecutive green pixels.

Figure 14:
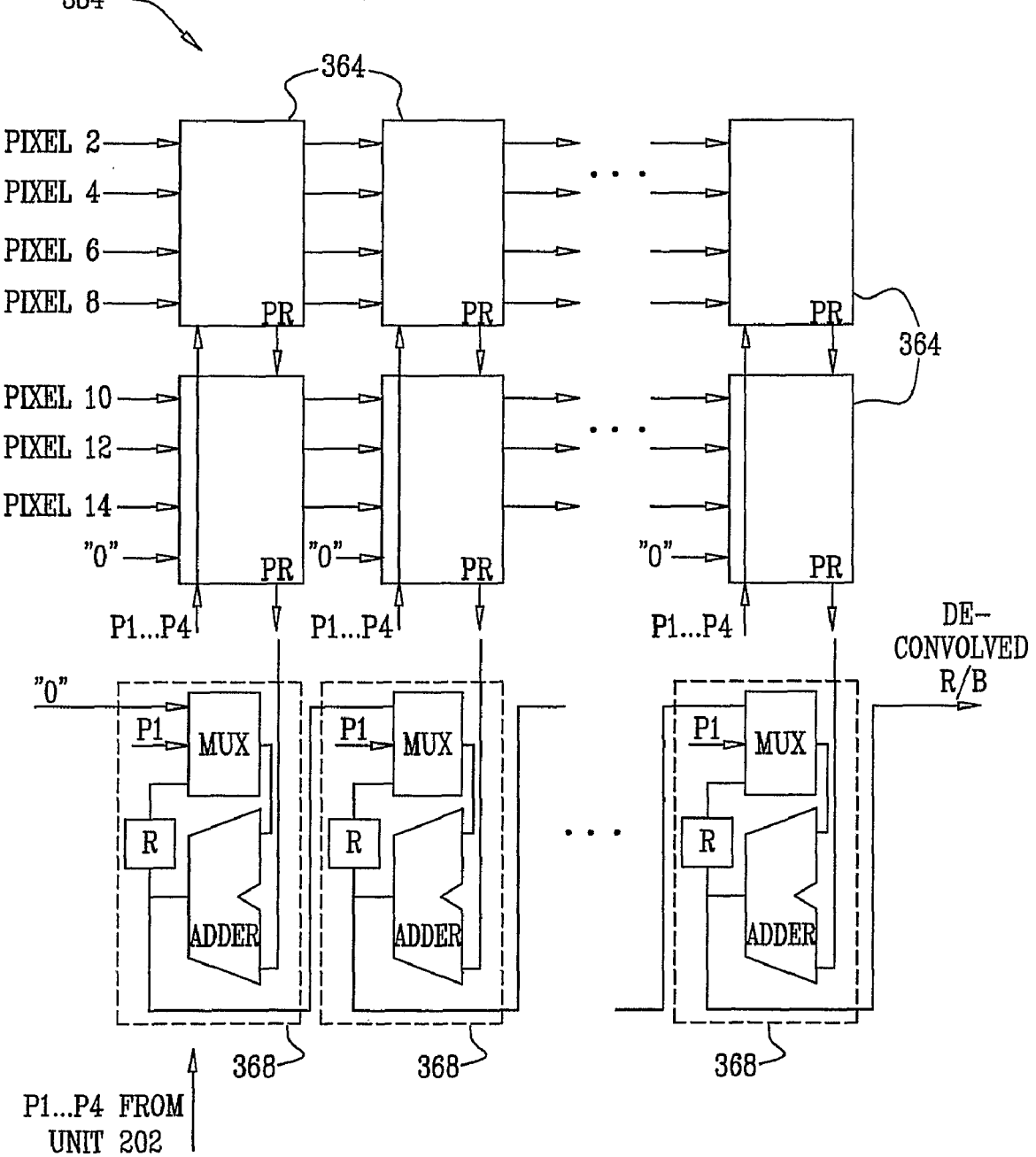
FIG. 14 is a block diagram that schematically illustrates a red/blue pixel pipelined deconvolver, in accordance with an embodiment of the present invention.

FIG. 14 is a block diagram that schematically illustrates a red/blue pixel pipelined deconvolver 384, in accordance with an embodiment of the present invention. Deconvolver 384 comprises fourteen filter cells 364, and operates in a similar fashion to deconvolver 360 of FIG. 13 above.

Figure 15:
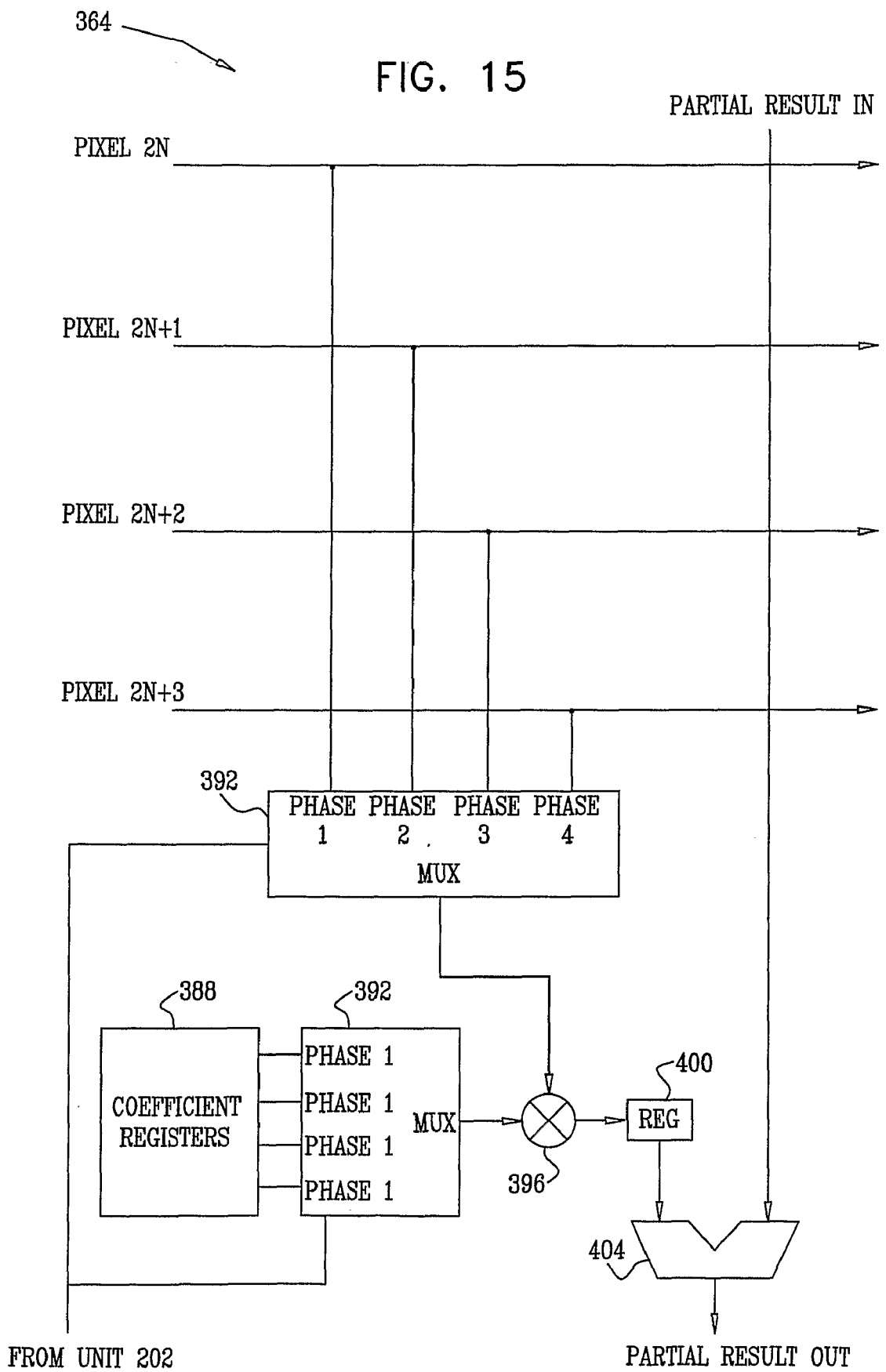
FIG. 15 is a block diagram that schematically illustrates a deconvolution filter cell used in the pipelined deconvolvers of FIGS. 13 and 14, in accordance with an embodiment of the present invention.

FIG. 15 is a block diagram that schematically illustrates the internal structure of filter cell 364 used in deconvolvers 360 and 384 of FIGS. 13 and 14 above, in accordance with an embodiment of the present invention.

Cell 364 comprises coefficient registers 388, multiplexers 392 and a multiplier 396, which function similarly to coefficient registers 246, multiplexers 250 and multiplier 254 of filter cell 238 described in FIG. 10 above. In the present embodiment, however, the output of multiplier 396 is stored in a register 400, and is added to the partial result accepted from a neighbor cell using an adder 404. The output of adder 404 is provided as the partial result (PR) output of the cell.

Although the embodiments of FIGS. 13-15 above refer to green and R/B deconvolvers that operate at twice the pixel clock rate, these embodiments are shown by way of example, in order to demonstrate the pipelined deconvolver configuration. In alternative embodiments, similar pipelined deconvolvers can be used implement other types of single-color (i.e., green or R/B) deconvolvers having other internal clock rates, such as deconvolvers suitable for use in circuit 60 of FIG. 4 above. Pipelined configurations can also be used in shared-multiplier deconvolvers, such as in circuit 260 of FIG. 11 above.

Image Segmentation and Deconvolution Filter Symmetry

In some practical cases, the blurring effects caused by optics 22 are not uniform across the input image. For example, the PSF of optics 22 may differ from one area of the image to another. Therefore, in some embodiments, different sets of deconvolution coefficients are used in different areas of the input image.

On the other hand, using a large number of different deconvolution kernels significantly increases the memory used for storing the deconvolution coefficients. For example, consider a 1,920,000 pixel input image, having 1,600 columns by 1,200 rows. In a typical application, this image is divided into seven hundred and sixty eight segments of 50×50 pixels. Each segment is mapped to a particular deconvolution kernel of 15×15 coefficients, of which two-hundred and eleven are non-zero. In this exemplary configuration, using a different kernel for each segment would require storing 211×768=162,048 deconvolution coefficients.

In many cases, however, the blur or other distortion of the input image is circularly-symmetrical around the center of the image. For example, in many optical systems, the PSF of a lens, which is part of optics 22, is symmetrical with respect to the axis of the lens. In such cases, because the lens is symmetrical around its axis, all the PSFs having the same distance from the center of the input image will be rotated versions of a single PSF function.

However, when dealing with a discrete PSF, defined, for example, as a 15×15 square grid, rotated versions of a given PSF will map to other grid locations of a 15×15 square if and only if the rotation angle is a multiple of 45°.

When the optical system has such a circular symmetry, a relatively small set of baseline deconvolution kernels can be used. Additional kernels, which are applied at areas having similar distance as the baseline kernels but different rotation angles, are produced from the baseline kernels, such as by symmetrically flipping the baseline kernels at 45° increments.

Figure 16:
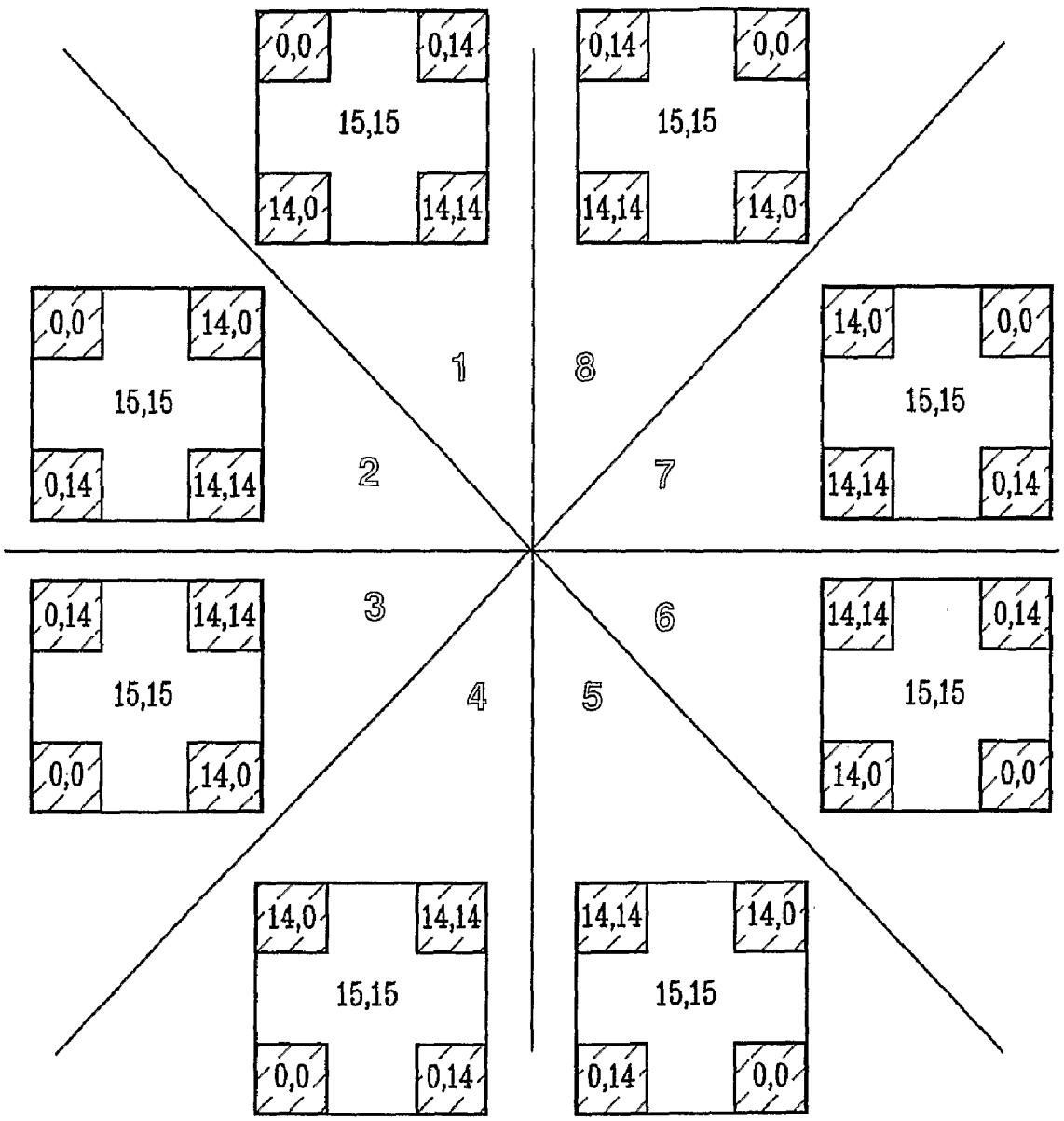
FIG. 16 is a diagram showing deconvolution filter symmetries, in accordance with an embodiment of the present invention.

FIG. 16 is a diagram showing deconvolution filter symmetries, in accordance with an embodiment of the present invention. In the exemplary embodiment of FIG. 16, the input image is divided into eight sector-shaped symmetry zones around its center. The symmetry zones are numbered 1 to 8. The deconvolution kernels used in zone 1 are considered to be the baseline, un-rotated kernels. In each of these kernels, as shown in the figure, the top-left coefficient is denoted 0,0; the top-right coefficient is denoted 1,14; the bottom-left coefficient is denoted 14,0 and the bottom-right coefficient is denoted 14,14. Symmetrical replicas of this kernel are used in the other seven zones.

To calculate a certain kernel in zone 2, the following steps are taken: First, a baseline kernel (i.e., a kernel in zone 1) that corresponds to the zone 2 kernel is selected. Selecting the appropriate baseline kernel is performed by flipping the location of the zone 2 kernel with respect to the 45° axis separating zone 1 from zone 2. Then, the selected baseline kernel is flipped with respect to this 45° axis, to produce the desired kernel.

The kernels for the other symmetry zones are produced in a similar manner. Each kernel comprises a flipped, symmetrical view of its neighbor with respect to the axis that separates between them. Using this technique, only the coefficient values of the baseline kernels need to be stored in memory.

Figure 17:
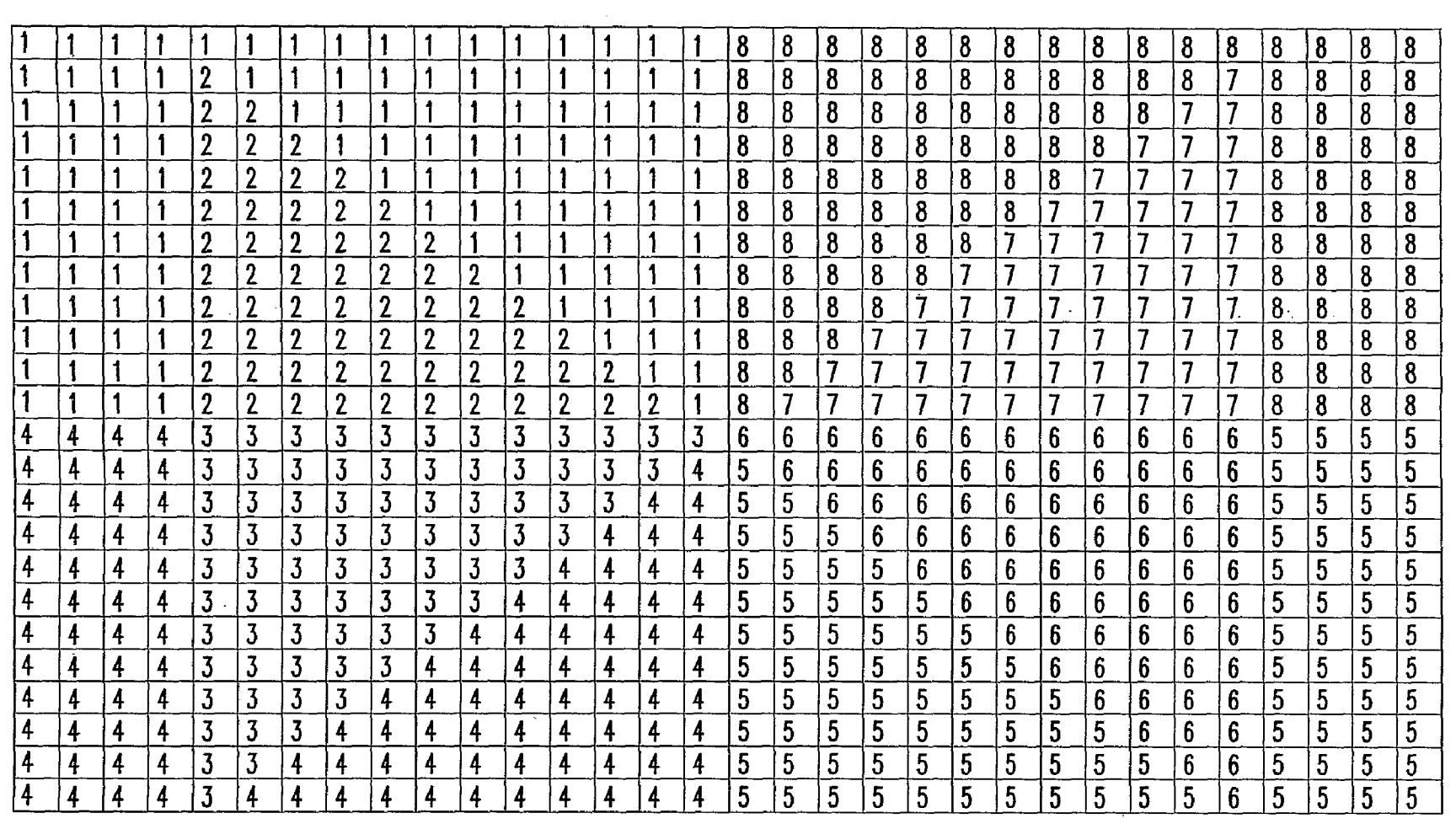

FIG. 17 is a diagram showing an assignment of deconvolution filter symmetries to segments, in accordance with an embodiment of the present invention. The figure shows the symmetrically-equivalent regions in a 1,920,000 pixel image, assuming 50×50 pixel segments. Each segment in FIG. 17 has a number in the range 1 . . . 8, referring to the symmetry zones in FIG. 16 above.

Figure 18:
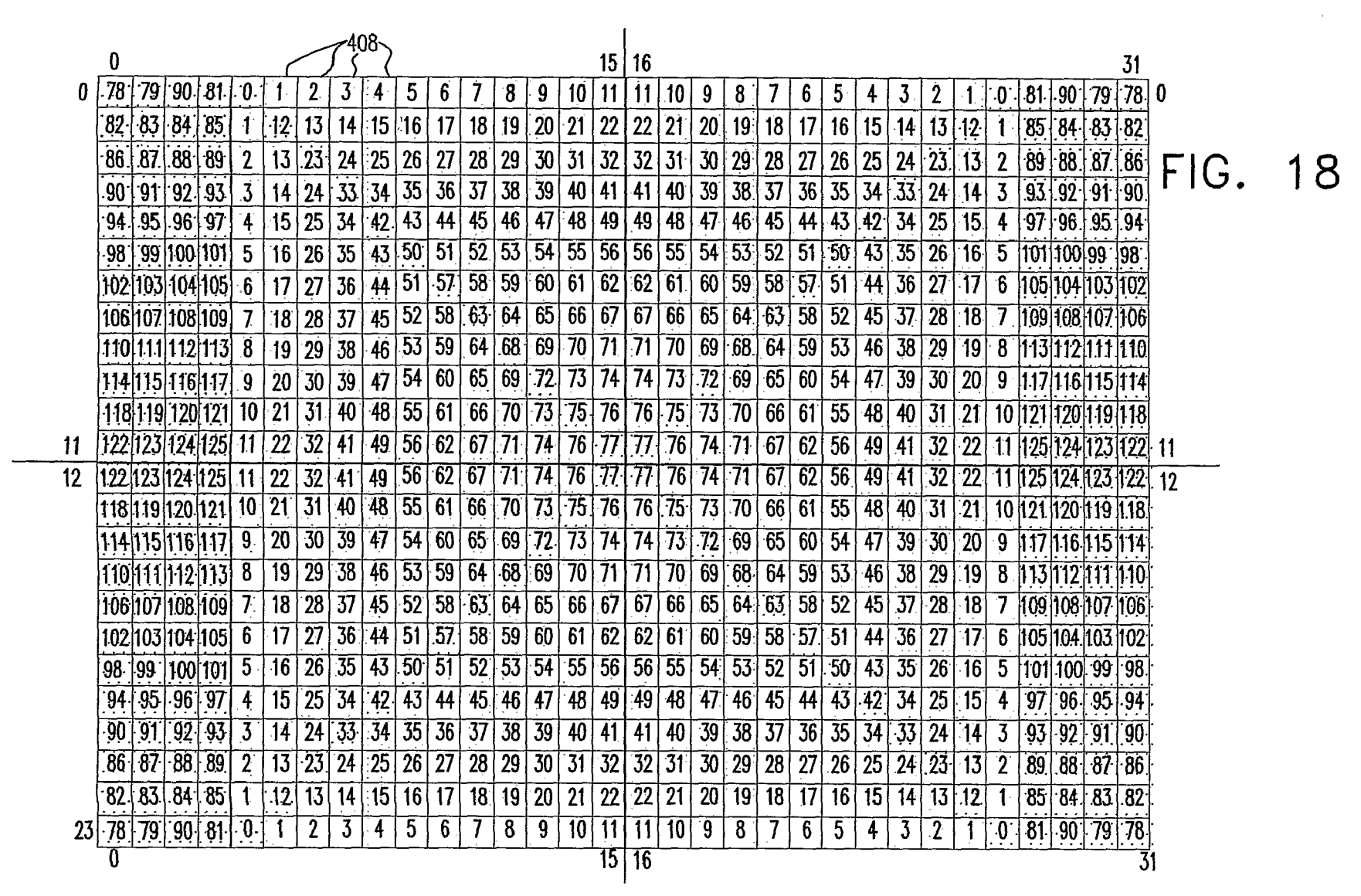

FIG. 18 is a diagram showing an assignment of deconvolution coefficients to segments of an image, in accordance with an embodiment of the present invention. The figure shows the image of FIG. 17 above, which is divided into seven hundred and sixty eight 50×50 pixel segments 408. The segments belonging to symmetry zone 1 are marked with an incrementing kernel index, between 1 . . . 126. In the other seven symmetry zones, each segment 408 is marked with the index of its corresponding baseline kernel. Thus, the entire image can be deconvolved using one-hundred and twenty-six different kernels, rather than seven-hundred and sixty-eight.

Note that since the input image is rectangular and not square, the eight-sector 45° symmetry applies only to the central, square part of the image. As can be seen in FIG. 18, the four left-most segment columns, as well as the four right-most segment columns (which correspond to segment indices 78 . . . 125) have 90° symmetry. Determining a deconvolution kernel in these regions is performed by flipping the appropriate baseline kernel in zone 1 with respect to the vertical and/or horizontal axes.

In alternative embodiments, the input image can be divided into a different number of segments and/or symmetry zones. For example, the same 1,920,000 pixel image can be divided into 100×100 pixel segments, producing thirty-three different symmetrically-equivalent segments in each symmetry zone.

Further alternatively, different areas of the input image can be divided into segments having different sizes. The segment size can be chosen to match the spatial variability of the PSF at different regions in the image. In other words, areas of the input image in which the PSF changes rapidly can be divided into smaller segments, while other areas in which the PSF changes more gradually can be divided into larger segments.

Although the embodiments described herein mainly refer to mosaics having green, red and blue filters, the methods and systems described herein can also be used with other types of mosaic filters. For example, such a mosaic may comprise a pattern of yellow, magenta, cyan and green filters, as is commonly used with charge-coupled device (CCD) image sensors.

Although the embodiments described herein mainly address image quality enhancement in digital cameras, the principles of the present invention can also be used for other image processing applications, such as pattern recognition applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An image enhancement circuit, comprising:
 an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;
 a plurality of filter cells, which are connected in a two-dimensional array configuration and are arranged to separately filter the input pixel values of each of the input sub-images with respective two-dimensional deconvolution kernels so as to produce respective output sub-images comprising output pixel values;
 wherein each of the plurality of filter cells comprises a circuit element;
 wherein each of the circuit elements provides an output, and wherein the image enhancement circuit comprises an adder that sums the outputs;
 and
 a multiplexer, which is coupled to multiplex together the output pixel values of the output sub-images so as to produce a filtered output image.

2. The circuit according to claim 1, wherein the input image has an input blur, and wherein the output image has an output blur, after filtering with the deconvolution kernels, that is smaller than the input blur.

3. An image enhancement circuit, comprising:
an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;
a plurality of filter cells, which are connected in a two-dimensional array configuration and are arranged to separately filter the input pixel values of each of the input sub-images with respective two-dimensional deconvolution kernels so as to produce respective output sub-images comprising output pixel values;
wherein each of the plurality of filter cells comprises a circuit element;
and
a multiplexer, which is coupled to multiplex together the output pixel values of the output sub-images so as to produce a filtered output image;
wherein the array configuration has rows and columns of the filter cells, wherein the input interface comprises a memory, which is arranged to buffer the input pixel values and to provide successive columns of the buffered input pixel values to the filter cells, and wherein each column of the filter cells is arranged to propagate the columns of the input pixel values to a next column of the filter cells in the array configuration so as to deconvolve the input pixel values with the deconvolution kernels.

4. The circuit according to claim 3, wherein the deconvolution kernels comprise filter coefficients, and wherein each of the filter cells comprises a multiplier, which is arranged to multiply one of the input pixel values by one of the filter coefficients to produce the output of the filter cell.

5. The circuit according to claim 4, wherein the multiplier is arranged to perform two multiplications in each cycle of a pixel clock at which the input pixels are accepted.

6. The circuit according to claim 4, and comprising an accumulator circuit, which is arranged to accumulate the outputs of the filter cells to produce the output pixel values.

7. The circuit according to claim 6, wherein the accumulator is arranged to accumulate the outputs over two successive cycles of a pixel clock at which the input pixels are accepted.

8. An image enhancement circuit, comprising:
an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;
a plurality of filter cells, which are connected in a two-dimensional array configuration and are arranged to separately filter the input pixel values of each of the input sub-images with respective two-dimensional deconvolution kernels so as to produce respective output sub-images comprising output pixel values;
wherein each of the plurality of filter cells comprises a circuit element;
and
a multiplexer, which is coupled to multiplex together the output pixel values of the output sub-images so as to produce a filtered output image;
wherein the array configuration has rows and columns of the filter cells, wherein the input interface is arranged to provide successive columns of the input pixel values to the filter cells such that each input pixel value is simultaneously provided to all the filter cells in a corresponding row of the filter cells, wherein each filter cell comprises a multiplier, which is arranged to multiply the input pixel value provided thereto by a filter coefficient of one of the deconvolution kernels to produce a multiplication result, and comprising an accumulation circuit, which is arranged to calculate column sums of the multiplication results in each of the columns of the filter cells, to apply delays to the column sums and to combine the delayed column sums to produce the output pixel values.

9. An image enhancement circuit, comprising:
an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;
a plurality of filter cells, which are connected in a two-dimensional array configuration and are arranged to separately filter the input pixel values of each of the input sub-images with respective two-dimensional deconvolution kernels so as to produce respective output sub-images comprising output pixel values;
wherein each of the plurality of filter cells comprises a circuit element;
and
a multiplexer, which is coupled to multiplex together the output pixel values of the output sub-images so as to produce a filtered output image;
wherein the stream of input pixel values is provided by a mosaic image sensor such that the pixel values in each of the input sub-images are produced by the image sensor responsively to light of a different respective color, and wherein the filter cells are arranged to filter the input sub-images to produce the output sub-images corresponding to the respective colors;
wherein the input sub-images comprise green, red and blue sub-images, and wherein the filter cells are configured in a first two-dimensional array, which is arranged to filter the input values belonging to the green sub-image, and a second two-dimensional array, which is arranged to alternately filter the input values belonging to the red and blue sub-images.

10. The circuit according to claim 3, wherein the deconvolution kernels comprise filter coefficients, wherein the filter cells comprise respective multipliers, which are arranged to multiply the input pixel values by the filter coefficients in accordance with a predetermined assignment, and comprising selection and accumulation logic, which is configured to separately accumulate outputs of the multipliers that multiply the input pixel values belonging to each of the input sub-images so as to produce the output pixel values.

11. An image enhancement circuit, comprising:
an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;
a plurality of filter cells, which are connected in a two-dimensional array configuration and are arranged to separately filter the input pixel values of each of the input sub-images with respective two-dimensional deconvolution kernels so as to produce respective output sub-images comprising output pixel values;

wherein each of the plurality of filter cells comprises a circuit element; and a multiplexer, which is coupled to multiplex together the output pixel values of the output sub-images so as to produce a filtered output image;

wherein the input image is divided into multiple segments, and wherein the filter cells are arranged to use at least a first and a second different deconvolution kernels for filtering the values of the input pixels located in respective at least a first and a second segments of the input image;

wherein the first and second segments have respective different first and second sizes, which are respectively determined responsively to a spatial variability of a blur in the first and second segments.

12. An image enhancement circuit, comprising:

an input interface, which is operative to accept a stream of input pixel values belonging to pixels of an input image, which comprises a plurality of different input sub-images comprising respective subsets of the pixels, such that the input pixel values of the pixels in the different input sub-images are interleaved in the stream;

a plurality of filter cells, which are connected in a two-dimensional array configuration and are arranged to separately filter the input pixel values of each of the input sub-images with respective two-dimensional deconvolution kernels so as to produce respective output sub-images comprising output pixel values;

wherein each of the plurality of filter cells comprises a circuit element; and a multiplexer, which is coupled to multiplex together the output pixel values of the output sub-images so as to produce a filtered output image;

wherein the input image is divided into symmetry zones based on a symmetrical property of a blur in the input image, and wherein the filter cells are arranged to filter the values of the input pixels located in one of the symmetry zones using baseline deconvolution kernels and to filter the values of the input pixels located in the other symmetry zones using respective deconvolution kernels determined by applying symmetrical operations to the baseline kernels.

13. A method for imaging, comprising:

accepting a stream of input pixel values belonging to pixels of an input image, which comprises a plurality of different input sub-images comprising respective subsets of the pixels, such that the input pixel values of the pixels in the different input sub-images are interleaved in the stream;

separately filtering the input values of each of the input sub-images with respective two-dimensional deconvolution kernels using a plurality of hardware-implemented filter cells connected in a two-dimensional array configuration so as to produce respective output sub-images comprising output pixel values;

wherein the two-dimensional array configuration has rows and columns of the plurality of filter cells;

wherein filtering the input pixel values comprises propagating the columns of the input pixel values from each column of the plurality of filter cells to a next column of the plurality filter cells in the two-dimensional array configuration so as to deconvolve the input pixel values with the deconvolution kernels; and multiplexing the output pixel values of the output sub-images so as to produce a filtered output image.

14. The method according to claim 13, wherein the input image has an input blur, and wherein filtering the input pixel values comprises causing the output image to have an output blur that is smaller than the input blur.

15. The method according to claim 13, wherein accepting the stream of input pixel values comprises buffering the input pixel values and providing successive columns of the buffered input pixel values to the filter cells.

16. The method according to claim 13, wherein the deconvolution kernels comprise filter coefficients, wherein each of the filter cells comprises a multiplier, and wherein filtering the input pixel values comprises multiplying one of the input pixel values by one of the filter coefficients by each of the multipliers to produce an output of the filter cell.

17. The method according to claim 16, wherein multiplying the input pixel values by the filter coefficients comprises performing two multiplications by each multiplier in each cycle of a pixel clock at which the input pixels are accepted.

18. The method according to claim 16, wherein filtering the input pixel values comprises accumulating the outputs of the filter cells to produce the output pixel values.

19. The method according to claim 18, wherein accumulating the outputs of the filter cells comprises accumulating the outputs over two successive cycles of a pixel clock at which the input pixels are accepted.

20. The method according to claim 13, wherein the array configuration has rows and columns of the filter cells, wherein accepting the stream of input pixel values comprises providing successive columns of the input pixel values to the filter cells such that each input pixel value is simultaneously provided to all the filter cells in a corresponding row of the filter cells, and wherein filtering the input pixel values comprises multiplying, in each filter cell, cell, the input pixel value provided thereto by a filter coefficient of one of the deconvolution kernels to produce a multiplication result, calculating column sums of the multiplication results in each of the columns of the filter cells, applying delays to the column sums and combining the delayed column sums to produce the output pixel values.

21. The method according to claim 13, wherein accepting the stream of input pixel values comprises accepting the stream from a mosaic image sensor such that the input pixel values in each of the input sub-images are produced by the image sensor responsively to light of a different, respective color, and wherein filtering the input pixel values comprises filtering the input sub-images to produce the output sub-images corresponding to the respective colors.

22. The method according to claim 21, wherein the input sub-images comprise green, red and blue sub-images, and wherein filtering the input pixel values comprises filtering the input values belonging to the green sub-image using a first two-dimensional array of the filter cells, and alternately filtering the input values belonging to the red and blue sub-images using a second two-dimensional array of the filter cells.

23. The method according to claim 13, wherein filtering the input pixel values comprises multiplying the input pixel values by filter coefficients of the deconvolution kernels using multipliers in the filter cells in accordance with a predetermined multiplier assignment, and separately accumulating outputs of the multipliers that multiply the input pixel values belonging to each of the input sub-images so as to produce the output pixel values.

24. The method according to claim 13, wherein filtering the input pixel values comprises dividing the input image into multiple segments and using at least a first and a second different deconvolution kernels for filtering the values of the input pixels located at respective at least a first and a second areas of the input image.

25. The method according to claim 24, wherein dividing the input image comprises selecting different first and second sizes respectively for the first and second segments responsively to a spatial variability of a blur in the first and second segments.

26. The method according to claim 13, wherein filtering the input pixel values comprises dividing the input image into symmetry zones based on a symmetrical property of a blur in the input image, filtering the values of the input pixels located in one of the symmetry zones using baseline deconvolution kernels, and filtering the values of the input pixels located in the other symmetry zones using respective deconvolution kernels determined by applying symmetrical operations to the baseline kernels.

27. Imaging apparatus, comprising:
- a mosaic image sensor, which is configured to generate a stream of input pixel values belonging to a plurality of input sub-images, each sub-image responsive to light of a different, respective color that is incident on the mosaic image sensor, such that the input pixel values of the pixels in the different input sub-images are interleaved in the stream;
- an image enhancement circuit, which is coupled to receive and filter the input pixel values in each of the input sub-images using a plurality of filter cells connected in a two-dimensional array configuration so as to generate a corresponding plurality of enhanced output sub-images;
- wherein the two-dimensional array configuration has rows and columns of the plurality of filter cells;
- wherein each column of each of the plurality of the filter cells is arranged to propagate the columns of the input pixel values to a next column of the filter cells in the two-dimensional array configuration so as to deconvolve the input pixel values with deconvolution kernels; and
- an image signal processor (ISP), which is coupled to receive and combine the plurality of the output sub-images in order to generate a color output image.

28. The imaging apparatus according to claim 27, wherein each of the input sub-images has an input blur, and wherein each of the output images has an output blur, after filtering with the deconvolution kernels, that is smaller than the input blur.

29. The imaging apparatus according to claim 27, wherein the deconvolution kernels comprise filter coefficients, and wherein each of the plurality of filter cells comprises a multiplier, which is arranged to multiply one of the input pixel values by one of the filter coefficients to produce an output of the filter cell.

30. The imaging apparatus according to claim 29, wherein the multiplier is arranged to perform two multiplications in each cycle of a pixel clock at which the input pixels are accepted.

* * * * *